(12) United States Patent
Kim

(10) Patent No.: US 11,333,355 B2
(45) Date of Patent: May 17, 2022

(54) APPARATUS FOR RECYCLING FLY ASH HAVING QUANTUM ENERGY GENERATOR

(71) Applicant: UNHAE ENC CO., LTD., Siheung-si (KR)

(72) Inventor: Boo Yeol Kim, Ansan-si (KR)

(73) Assignee: UNHAE ENCCO., LTD., Siheung-si (KR)

( * ) Notice: Subject to any disclaimer, the term of this patent is extended or adjusted under 35 U.S.C. 154(b) by 154 days.

(21) Appl. No.: 16/798,357

(22) Filed: Feb. 22, 2020

(65) Prior Publication Data

US 2020/0271316 A1    Aug. 27, 2020

(30) Foreign Application Priority Data

Feb. 22, 2019    (KR) .......................... 10-2019-0021073

(51) Int. Cl.
| | | |
|---|---|---|
| *F23G 5/10* | (2006.01) | |
| *C04B 7/26* | (2006.01) | |
| *C04B 7/46* | (2006.01) | |
| *F23G 5/44* | (2006.01) | |
| *C04B 7/44* | (2006.01) | |

(52) U.S. Cl.
CPC ............... *F23G 5/10* (2013.01); *C04B 7/26* (2013.01); *C04B 7/4415* (2013.01); *C04B 7/46* (2013.01); *F23G 5/444* (2013.01); *F23G 2202/701* (2013.01); *F23G 2209/30* (2013.01)

(58) Field of Classification Search
CPC ...... F23G 5/10; F23G 5/444; F23G 2202/701; F23G 2209/30; C04B 7/26; C04B 7/46; C04B 7/4415; C04B 18/08; F23J 2700/001; B09B 2220/06
See application file for complete search history.

(56) References Cited

U.S. PATENT DOCUMENTS

2020/0158335 A1*    5/2020    Dhyllon ................. F23G 5/027

FOREIGN PATENT DOCUMENTS

| KR | 10-1514124 A | 5/2015 |
|---|---|---|
| KR | 10-1547959 B1 | 9/2015 |
| KR | 10-1801530 B1 | 12/2017 |

* cited by examiner

*Primary Examiner* — David J Laux
(74) *Attorney, Agent, or Firm* — Maschoff Brennan

(57) ABSTRACT

An apparatus for recycling fly ash has a quantum energy generator therein. The apparatus recycles fly ash generated as the combustion waste from the burning of coal in thermal power plants, into construction materials such as cement substitutes, environment-friendly cover materials, etc. Unburned pulverized coal is removed while generating carbon monoxide (CO) or carbon dioxide ($CO_2$) through a combustion reaction, in which the unburned pulverized coal of the fly ash contacts the thermal electrons discharged during a thermal decomposition process at a high temperature, the negative electrodes of the thermal decomposition part, which are heated at a high temperature of 500° C., which is an ignition point of the unburned pulverized coal, or higher, and a high-voltage discharge electrode of an electrochemical reaction part, then heated at 500° C. or higher, and then naturally burned under an oxygen atmosphere (oxygen or ionized oxygen ions in air contained in the fly ash).

18 Claims, 8 Drawing Sheets

[FIG. 1]
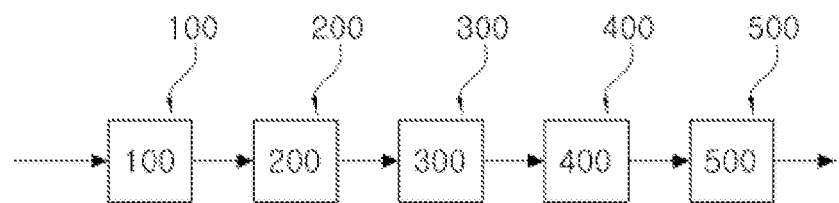
[FIG. 2]
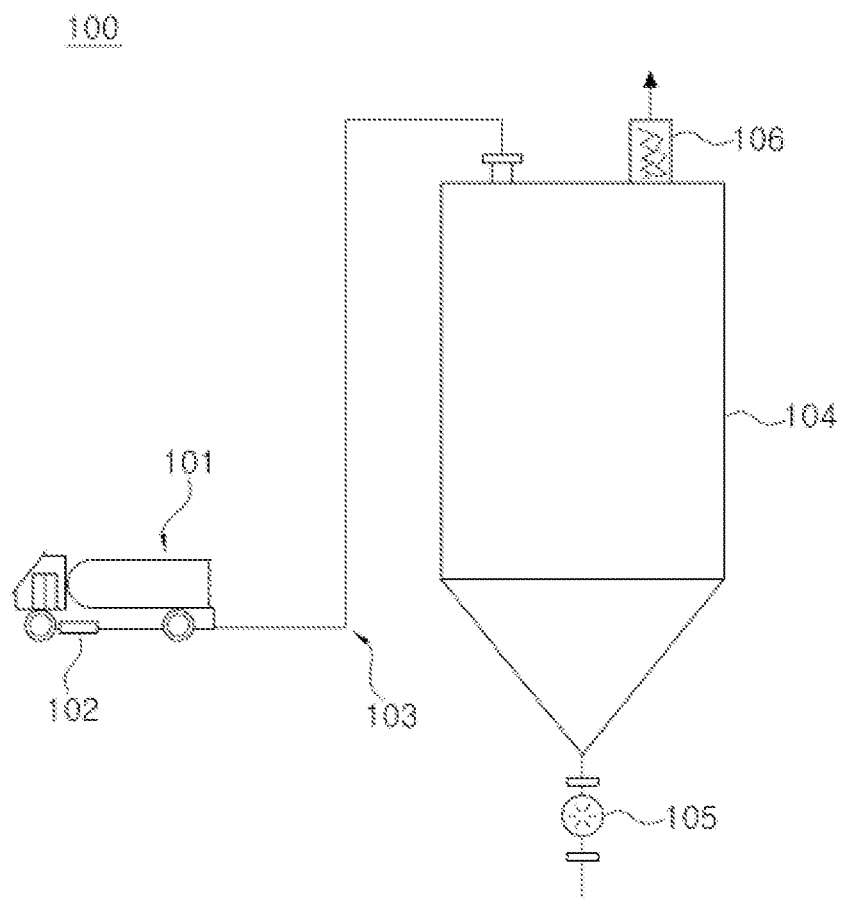

[FIG. 3]
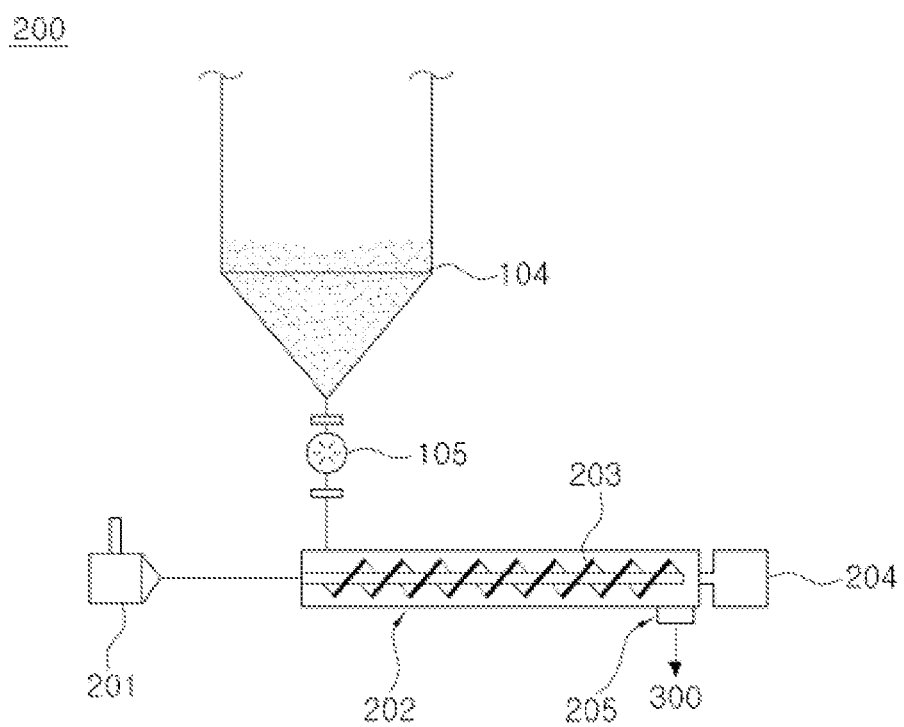

[FIG. 4a]
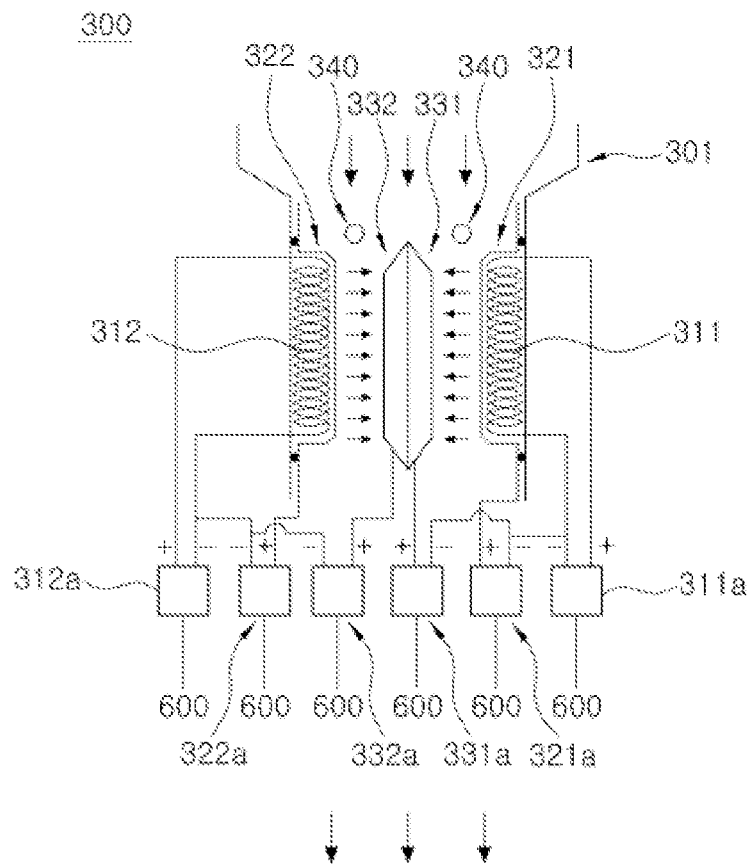
[FIG. 4b]
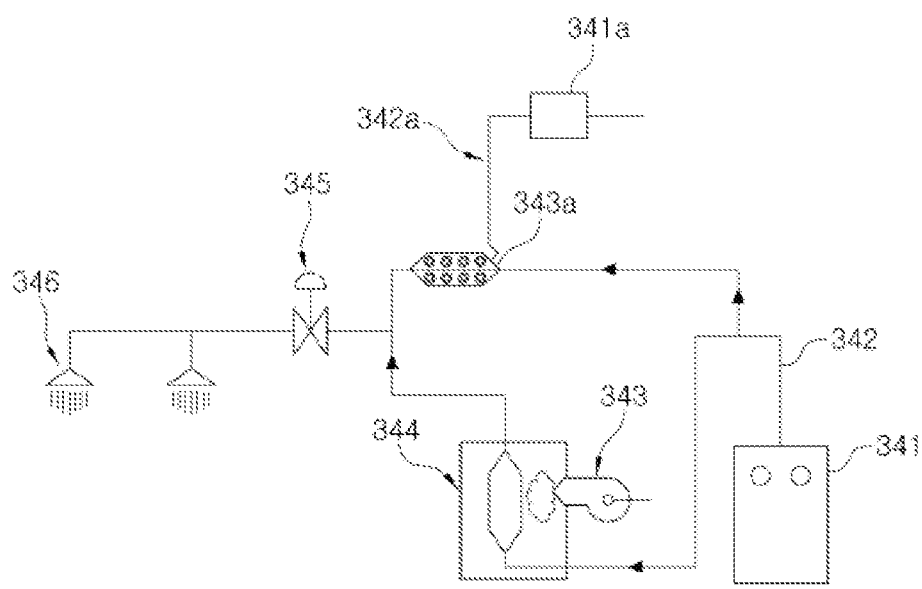

[FIG. 5]
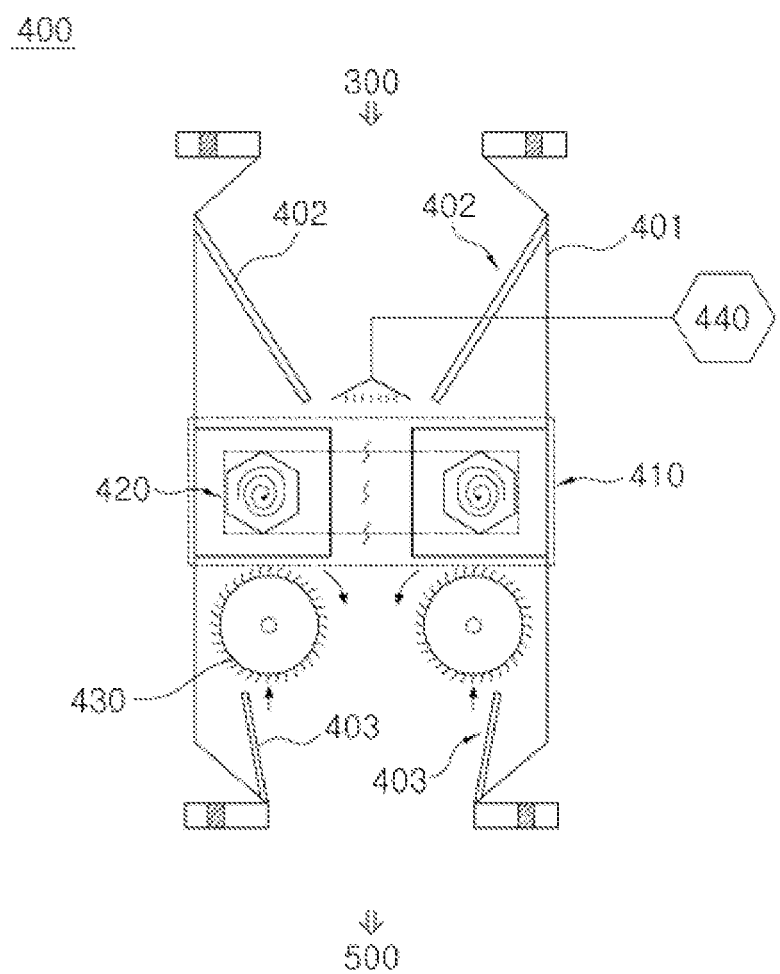

[FIG. 6a]
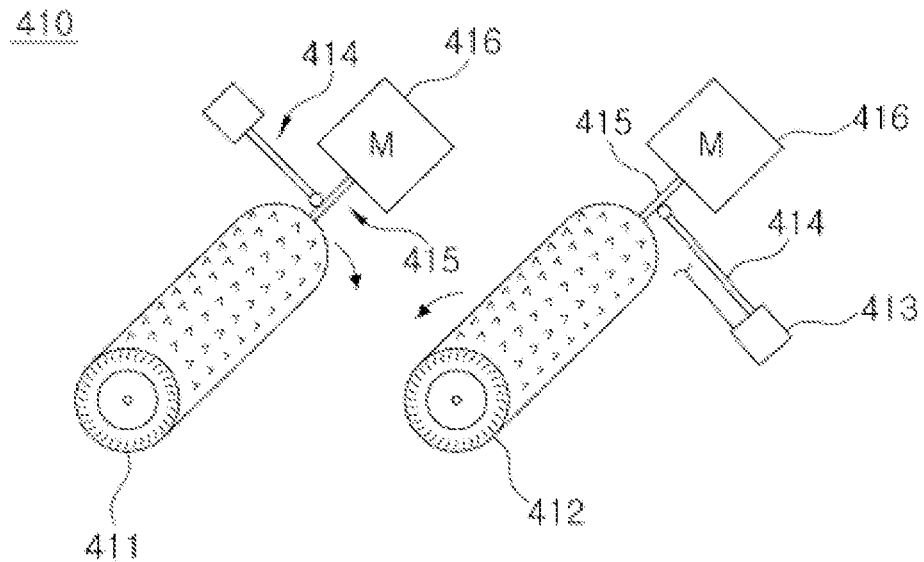
[FIG. 6b]
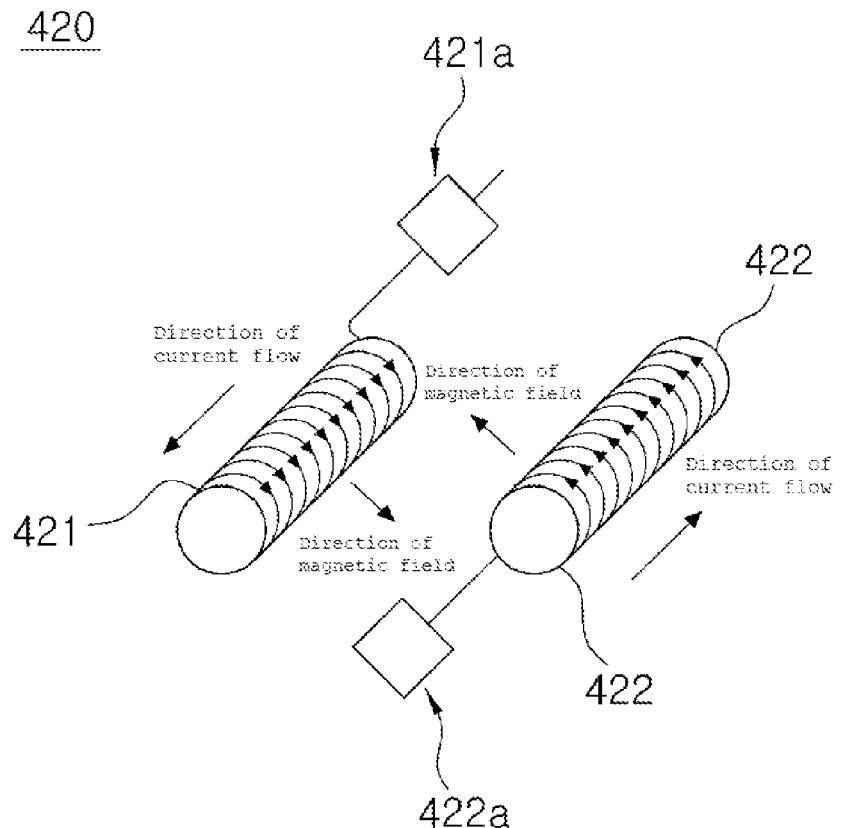

[FIG. 6c]
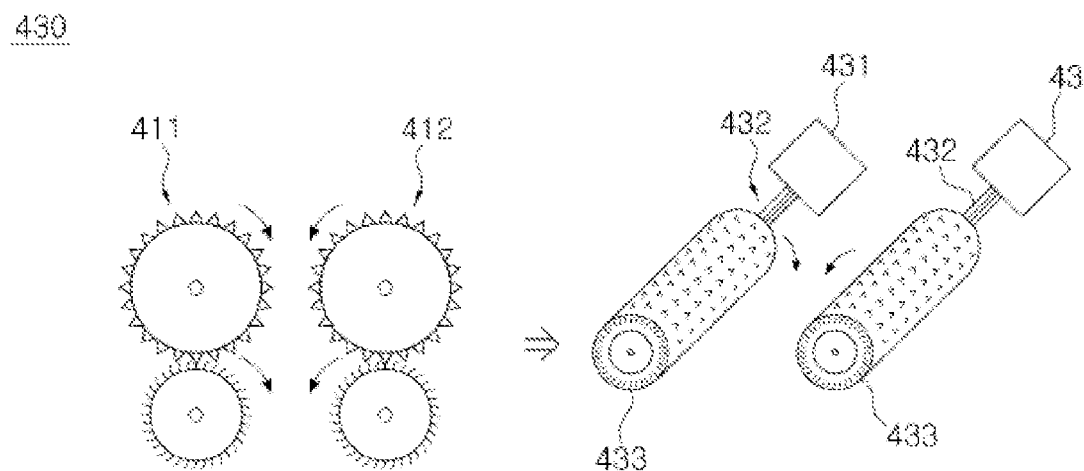
[FIG. 6d]
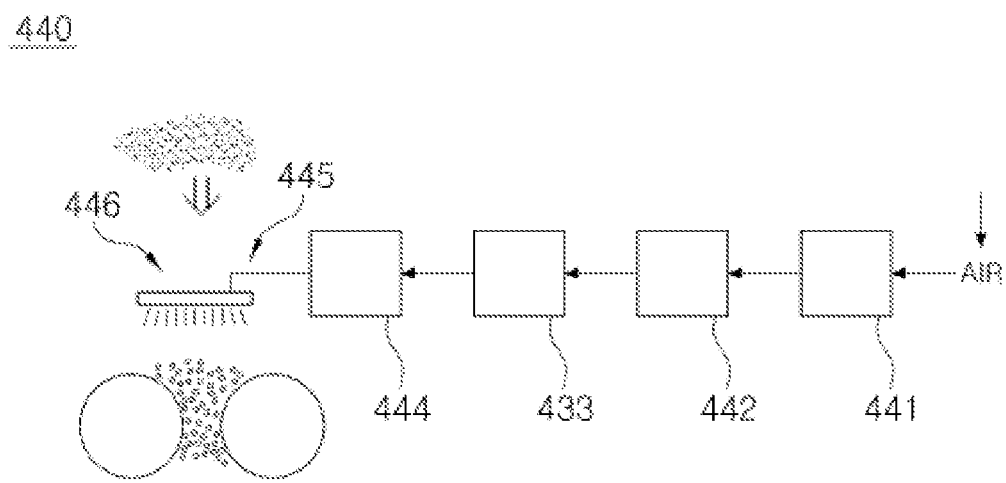

[FIG. 7]
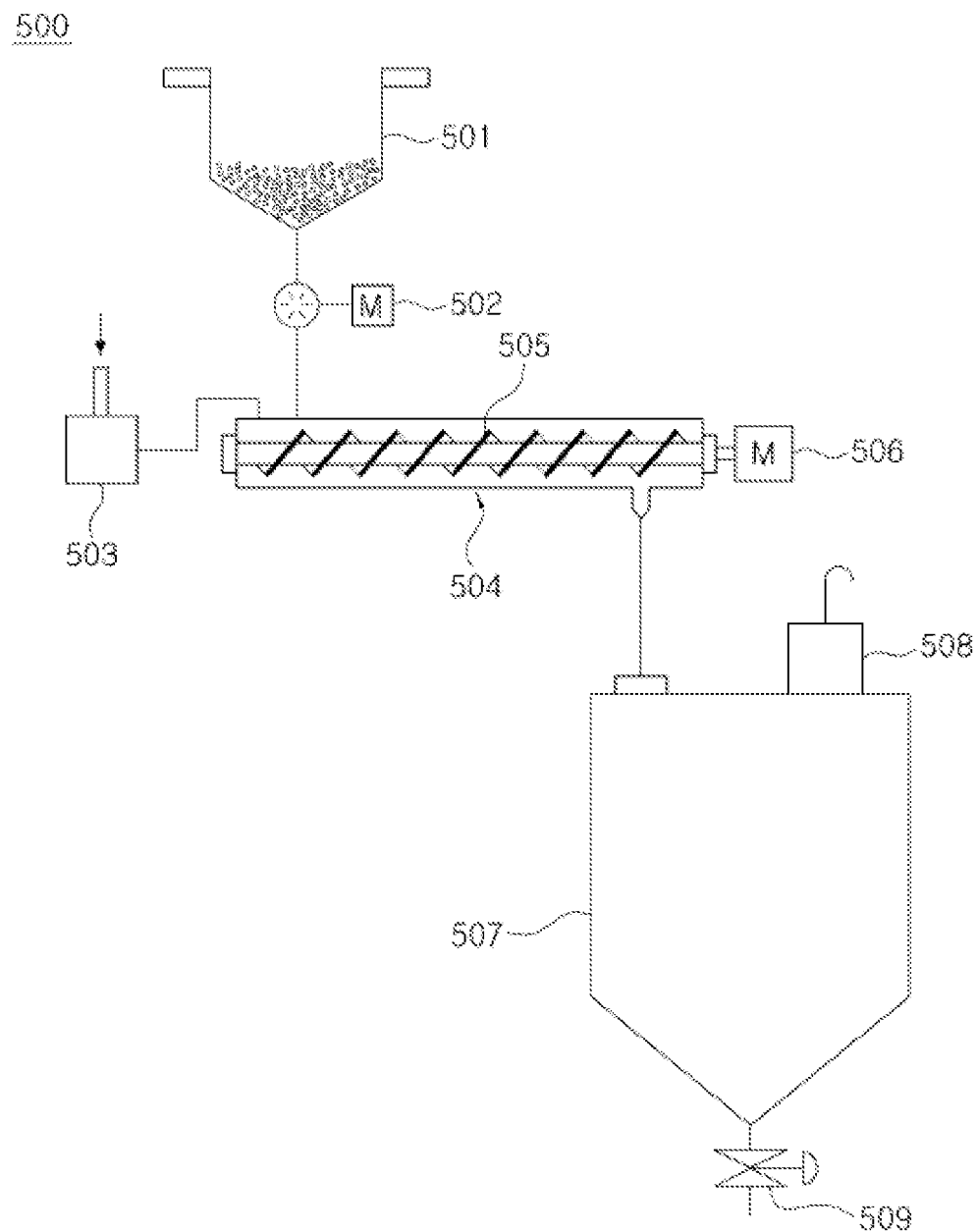

[FIG. 8]
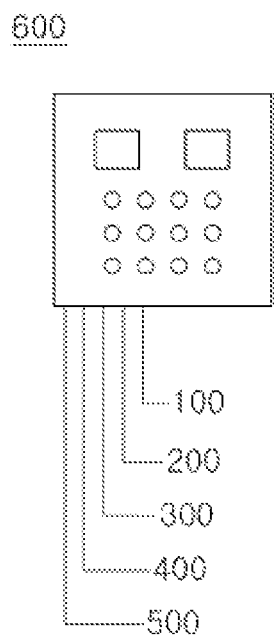

APPARATUS FOR RECYCLING FLY ASH HAVING QUANTUM ENERGY GENERATOR

TECHNICAL FIELD

The present invention relates to an apparatus for recycling fly ash having a quantum energy generator therein, and more particularly to an apparatus for recycling the fly ash generated after burning coal in thermal power plants, which is the combustion wastes generated from the thermal power plants, etc., into construction materials such as cement substitutes, environment-friendly cover materials, etc. by burning and removing unburned pulverized coal out of the fly ash through the thermal electrons discharged from a thermal decomposition process at a high temperature, the thermal electrons and electric charges discharged from a high-voltage discharge process, as well as at least one electrochemical reaction out of dissociation, excitation, oxidation and reduction, and removing a glassy membrane coated on fly ash particles through an elastic collision between the fly ash particles and the charged particles including electrons, ions or the like, and thermal electrons, thereby solving the problems raised so far, such as a decrease in compressive strength, etc. caused by containing unburned pulverized coal in the fly ash and when recycling the ash derived from a glassy membrane coated on a surface of ash particles.

BACKGROUND ART

The fly ash is a particle of micrometer size (μm) generated during a combustion process of coal in thermal power plants producing electricity, and this particle may contain various oxides such as silicon dioxide ($SiO_2$), calcium oxide (CaO), sodium oxide ($Na_2O$), magnesium oxide (MgO), potassium oxide ($K_2O$), barium oxide (BaO), alumina ($Al_2O_3$), iron ($Fe_2O_3$), etc. as well as carbon residues (pulverized coal).

The fly ash has been used for many purposes as an additive for various materials. For example, when being mixed with lime and water, the fly ash forms a cementitious composition having properties very similar to those of Portland cement. Due to this similarity, the fly ash may be used to replace a part of cement in concrete.

In case of manufacturing concrete by using the fly ash, the amount of cement used may be reduced and thus the amount of carbon dioxide generated from a process of manufacturing cement as well as the cost of manufacturing may be reduced as much as the amount of cement used is reduced. Furthermore, it is also possible to achieve an effect of improving performance, such as more convenient construction due to an increase in fluidity, better long-term strength, more chemical durability and the like.

However, when using the fly ash as an admixture of concrete, the fly ash is subject to quenching treatment at a high temperature (1300° C.) during a generation process thereof, and thus materials such as silicon dioxide ($SiO_2$), calcium oxide (CaO), magnesium oxide (MgO), barium oxide (BaO), aluminum oxide ($Al_2O_3$), etc. are condensed into a spherical shape and formed as a glassy membrane on a surface of particles, thereby obtaining latent hydraulic property, which may not directly react with water in itself. Further, this glassy membrane has a property of being destroyed when being exposed to an alkali environment and thus induces a hydration reaction through an alkali stimulant such as NaOH, KOH and $Ca(OH)_2$.

To solve such problem, however, in case of using a strong basic material as a substitute material for the alkali stimulant, there is a risk of causing a corrosion in contact with a worker's skin and construction costs are also increased as an expensive material.

Further, the fly ash has unburned pulverized coal (dust coal) therein, and the unburned pulverized coal refers to an amorphous carbon particle which remains unburned after incomplete burning inside a boiler of a thermal power plant. If the fly ash entraining a large amount of unburned carbon is used as a substitute material for cement, it is necessary to add a large amount of air entraining and water reducing agent (AE) to secure an equal slump and there also occurs a problem of deteriorating performance such as a decrease in durability, etc.

If fly ash is added to concrete, preferred characteristics of cement are provided, but the unburned carbon in the fly ash may fail to sufficiently entrain air in concrete. Thus, to control an amount of air entrained in a process of mixing and depositing concrete, a surfactant is added to a concrete mixture to stabilize an air void system.

As described above, there is a demand for providing a method and system for treating the fly ash better, which may overcome difficulty of mixing a bulk of the fly ash with a liquid treatment agent.

Further, there is a need for providing a method and system for manufacturing uniform fly ash, which does not require a drastic change in a current method for manufacturing and treating fly ash, thereby minimizing investment costs for carrying out the former method accordingly.

To treat fly ash above, Korean Registered Patent No. 10-1801530 (Apparatus for treating coal ash and treatment method for coal ash using the same) discloses a method for collecting exhaust gas discharged from a boiler of a coal-fired thermal power plant to separate such gas into raw gas including ash content and sulfur compounds, preparing sulfuric acid by using the separated sulfur compounds, allowing the prepared sulfuric acid and the ash content to come into contact with each other to make a mixture, separating slurry and liquid extract from the mixture, and drying the separated slurry and the liquid extract, and this invention does not mention any technique for treating unburned pulverized coal out of fly ash and removing a glassy membrane coated on a surface of the fly ash.

Korean Patent Publication No. 10-1547959 (Method for collecting unburned carbon from bottom ash using a corona discharge type electrostatic screening method) provides a technique in which unburned carbon is collected and separated by particle size in order to recycle the bottom ash reclaimed in coal ash generated after burning coal in a thermal power plant into construction materials, etc., crushed and floating impurities are removed to improve screening efficiency, a sieving separation is performed to concentrate a content of unburned carbon, iron powder is separated by applying a magnetic field of 2000 gauss to the bottom ash with concentrated unburned carbon, and the bottom ash with the iron powder separated therefrom is subject to a corona discharge type electrostatic screening so as to collect unburned carbon from the bottom ash. This technique may not remove the glassy membrane of bottom ash particles.

Korean Patent Publication No. 10-1514124 (Method for removing unburned carbon from fly ash using plasma) provides a technique in which 1.2 g of fly ash is dispersed inside a chamber in a plasma treatment process, an oxidant such as oxygen ($O_2$), vapor ($H_2O$), mixed fluid ($O_2+H_2O$) of oxygen and vapor, etc. are added thereto, a pressure inside the chamber is reduced to 0.5 torr, and the resulting fly ash is heated to 150° C. and subject to plasma treatment so as to remove the fly ash up to less than 1%. This technique has problems of reducing the pressure to 0.5 torr inside the chamber, continuously consuming the oxidant, and not removing a glassy membrane of the surface of fly ash. Further, this device is too complicated to be enlarged and requires high investment and maintenance costs.

As described above, the conventional techniques for treating the fly ash collected from the gas of coal burned during a process of thermal power plants have been insufficient in terms of treatment efficiency due to the aforementioned problems, but nothing has been presented as an specific alternative to treat the fly ash in a large quantity while securing safety and durability.

PRIOR ART DOCUMENTS

Patent Documents (Patent Document 0001) 1. Korean Registered Patent No. 10-1801530 (Apparatus for treating coal ash and treatment method for coal ash using the same)

(Patent Document 0002) 2. Korean Patent Publication No. 10-1547959 (Method for collecting unburned carbon from bottom ash using a corona discharge type electrostatic screening method)

(Patent Document 0003) 3. Korean Patent Publication No. 10-1514124 (Method for removing unburned carbon from fly ash using plasma)

DISCLOSURE

Technical Problem

The present invention has been made to solve the above problem.

The present invention provides an apparatus for recycling fly ash having a quantum energy generator therein, including:

a first reservoir installed at a rear end of a boiler of a thermal power plant and configured to transport fly ash collected from an electric dust collector by using a tank lorry, after the fly ash is discharged from coal burned in the boiler, and configured to transfer the fly ash into a blower attached to a vehicle body, and feed and store the fly ash into a storage tank;

a feeder connected to the first reservoir and configured to feed high pressure air generated from a blower installed at one side of a feeding pipe and open a motor-operated rotary valve installed at a lower part of the storage tank to feed the fly ash stored in the first reservoir, and configured to rotate a screw installed inside the feeding pipe through a motor so as to feed the fly ash to a thermal decomposition part;

the thermal decomposition part configured to discharge thermal electrons from surfaces of heating members and negative electrodes by heating the heating members and the negative electrodes at a high temperature of 500° C. or higher by supplying DC power to a plurality of heating members of a quantum energy generator and the negative electrodes, configured to accelerate by electrical attraction the thermal electrons discharged from the surfaces of the plurality of heating members of the quantum energy generator and the negative electrodes, which are heated by giving a potential difference between DC power suppliers for the plurality of heating members of the quantum energy generator and DC power suppliers for the negative electrodes, and between DC power suppliers for negative electrodes and DC power suppliers for positive electrodes, configured to extend retention time of the thermal electrons discharged from the surfaces of the heating members and the negative electrodes by a magnetic field generated at an angle of 90 degrees with respect to a direction of current flow by supplying power to the plurality of heating members of the quantum energy generator, which are wound in opposite directions to each other, from the DC power suppliers, configured to primarily remove a glassy membrane covering the surface of fly ash particles by increasing a number and intensity of elastic collisions with the fly ash particles passing through a fluid passage formed between negative electrodes and positive electrodes by activating the thermal electrons through quantum energy generated in a zero magnetic field state in which magnetic fields are overlapped and extinguished at the center of the fluid passage, configured to primarily remove unburned pulverized coal while generating carbon monoxide (CO) or carbon dioxide ($CO_2$) through a combustion reaction, in which the unburned pulverized coal out of the fly ash is heated by coming into contact with the surfaces of the negative electrodes heated at a high temperature of 500° C., which is an ignition point of the unburned pulverized coal, or higher, out of the fly ash particles passing through the fluid passage, configured to secondarily remove a glassy membrane by allowing the generated carbon dioxide ($CO_2$) to react with main components of the glassy membrane coated on the fly ash particles, which include calcium oxide (CaO), sodium oxide ($Na_2O$), magnesium oxide (MgO), potassium oxide ($K_2O$) and barium oxide (BaO), thereby generating calcium carbonate ($CaCO_3$), magnesium carbonate ($MgCO_3$), potassium carbonate ($K_2CO_3$), barium carbonate ($BaCO_3$), etc., and configured to thirdly remove the glassy membrane by spraying superheated steam generated from a steam feeder 34) onto the fly ash introduced through the spray nozzle 346 in an environment in which magnetic fields are generated from the first and second heating members 311 and 312, quantum energy generated in a zero magnetic field state caused by an extinguishment of the magnetic fields is irradiated, and the thermal electrons discharged from the heated negative electrodes 321 and 322 are accelerated in a direction of the positive electrodes 331 and 332 by electrical attraction, thereby allowing the steam and the fly ash particles to come into contact with each other or to be mixed with each other while causing a hydration reaction, so that main components of the glassy membrane coated on the surface of the fly ash particles, which include silicon dioxide ($SiO_2$), calcium oxide (CaO), sodium oxide ($Na_2O$), magnesium oxide (MgO), potassium oxide ($K_2O$) and barium oxide (BaO), are converted into basic materials including silicon hydroxide ($Si(OH)_4$), calcium hydroxide ($Ca(OH)_2$), sodium hydroxide (NaOH), barium hydroxide ($Ba(OH)_2$), magnesium hydroxide ($Mg(OH)_2$) and aluminum hydroxide ($2Al(OH)_3$);

an electrochemical reaction part in which a discharge electrode and a ground electrode of a discharge unit, which is provided therein with a plurality of heating members of the quantum energy generator wound in opposite directions to each other and insulated from each other, are installed inside a housing to face each other, each one side of the discharge electrode and the ground electrode is connected to a shaft and passes through the housing so as to be connected to a driving motor installed in an external holder, power suppliers supply power to the heating members of the quantum energy generator installed inside the discharge electrode and the ground electrode while being insulated from each other to generate heat while forming a magnetic field at an angle of 90° C. with respect to a direction of current flow to heat the discharge electrode and the ground electrode at 500° C., which is an ignition temperature of unburned pulverized coal, or more, a high-voltage generated from a high-voltage generator is supplied to the discharge electrode and the ground electrode through a conducting wire to form a high electric field energy (5 eV-5 KeV) band between the two electrodes, which is larger than a work function (eV)(1.1 eV-5.0 eV) of main components of a glassy membrane, which include silicon dioxide ($SiO_2$), calcium oxide (CaO), magnesium oxide (MgO), barium oxide (BaO), alumina ($Al_2O_3$), etc., the fly ash passes through this high electric field energy band, so that the fly ash particles and the thermal electrons discharged from the surfaces of the two electrodes heated at a high temperature come into elastic collision with the charged particles including electrons, ions or the like, and the thermal electrons discharged from a discharge process of the two electrodes, to which a high voltage is applied, come into elastic collision with each other, a magnetic field generated from the plurality of heating members of the quantum energy generator, wound in opposite directions to each other, is applied to extend retention time of the charged particles including electrons, ions or the like, and the thermal electrons, thereby increasing a number of elastic collisions, and removing the glassy membrane covering the surface of the fly ash particles once again after the thermal decomposition part, the unburned pulverized coal out of the fly ash is heated by coming into contact with the surfaces of the discharge electrode and the ground electrode, which are heated at 500° C., which is an ignition temperature of unburned pulverized coal, or higher, a combustion reaction is progressed through a natural ignition or by spark or flame generated between the discharge electrode and the ground electrode during a discharge operation, while generating carbon monoxide (CO) and carbon dioxide ($CO_2$), thereby removing the unburned pulverized coal once again after the thermal decomposition part, and the fly ash particles attached onto the surfaces of the discharge electrode and the ground electrode are removed by using a brush;

a second reservoir including a hopper for temporarily storing the fly ash finally treated in the electrochemical reaction part and configured to feed and store the fly ash into the storage tank through rotation of a screw and compressed air, which is fed from the blower, if a motor installed at one side of the discharge pipe is driven to rotate the screw, while opening the rotary valve attached to a lower part of the hopper to send the fly ash stored in the hopper to the feeding pipe; and a control panel configured to play a controlling role, such as supplying power to and shutting off power from the first reservoir, the feeder, the thermal decomposition part, the electrochemical reaction part and the second reservoir through data which are measured in real time by a sensor installed in the first reservoir, the feeder, the thermal decomposition part, the electrochemical reaction part and the second reservoir and transmitted to the control part.

Technical Solution

To achieve the technical object above, an apparatus for recycling fly ash having a quantum energy generator therein according to the present invention may include a first reservoir (100), a feeder (200), a thermal decomposition part (300), an electrochemical reaction part (400), a second reservoir (500) and a control panel (600).

To describe in more detail, the apparatus for recycling fly ash having a quantum energy generator therein according to the present invention may include: the first reservoir (100) installed at a rear end of a boiler of a thermal power plant and configured to transport the fly ash collected from an electric dust collector by using a tank lorry (101), after the fly ash is exhausted from the coal burned in the boiler, and feed and store the fly ash into a storage tank (104) through a feeding pipe (103) by connecting an outlet line of a blower (102) attached to a vehicle body to an inlet of a feeding pipe, driving the blower (102) to feed the pressurized air to one side of the feeding pipe;

a feeder (200) connected to the storage tank (104) and configured to feed air pressurized from a blower (201) installed at one side of a feeding pipe into a discharge pipe (202) and drive a motor-operated rotary valve (105) installed at a lower part of the storage tank (104) to feed the fly ash stored in the first reservoir (100) to the feeding pipe, and configured to drive a driving motor (204) connected with a screw (203) installed inside the feeding pipe (202) by a shaft to rotate a driving motor (204), thereby discharging the fly ash introduced in the feeding pipe through rotation of the screw into a discharge port (205) connected to a thermal decomposition part (300);

the thermal decomposition part (300) configured to discharge thermal electrons from surfaces of heating members and negative electrodes by heating the heating members and the negative electrodes at a high temperature of 500° C. or higher by supplying DC power to a plurality of heating members (311 and 312) of a quantum energy generator (300) and the negative electrodes (321 and 322), configured to accelerate by electrical attraction the thermal electrons discharged from the surfaces of the plurality of heating members (311 and 312) of the quantum energy generator (310) and the negative electrodes (321 and 322), which are heated by giving a potential difference between DC power suppliers (311a and 312a) for the plurality of heating members (311 and 312) of the quantum energy generator (310) and DC power suppliers (321a and 322a) for the negative electrodes (321 and 322), and between DC power suppliers for negative electrodes (321a, 322a) and DC power suppliers for positive electrodes (331a, 332a), configured to primarily remove a glassy membrane coated on the surface of fly ash particles by increasing a number and intensity of elastic collisions between the thermal electrons and the fly ash particles passing through a fluid passage formed between negative electrodes and positive electrodes by extending retention time of the thermal electrons discharged from the surfaces of the heating members and the negative electrodes by a magnetic field generated at an angle of 90 degrees with respect to a direction of current flow by supplying power to the plurality of heating members (311 and 312) of the quantum energy generator (310), which are wound in opposite directions to each other, from the DC power suppliers (311a and 312a), configured to primarily remove unburned pulverized coal while generating carbon monoxide (CO) or carbon dioxide ($CO_2$) through a combustion reaction, in which the unburned pulverized coal out of the fly ash comes into contact with the surfaces of the negative electrodes, which are heated at a high temperature of 500° C., which is an ignition point of carbon (C), or higher, while passing through the fluid passage, so that the unburned pulverized coal is naturally burned under an oxygen atmosphere (oxygen in air contained in the fly ash), configured to secondarily remove a glassy membrane coated on the fly ash particles by allowing the carbon dioxide ($CO_2$) generated from the combustion reaction to react with main components of the glassy membrane coated on the fly ash particles, which include calcium oxide (CaO), sodium oxide ($Na_2O$), magnesium oxide (MgO), potassium oxide ($K_2O$) and barium oxide (BaO), thereby generating carbonates such as calcium carbonate ($CaCO_3$), magnesium carbonate ($MgCO_3$), potassium carbonate ($K_2CO_3$), barium carbonate ($BaCO_3$), etc., configured to thirdly remove the glassy membrane by spraying superheated steam generated from a steam feeder (340) onto the fly ash introduced through the spray nozzle (346) in an environment in which thermal electrons are discharged from the negative electrodes (321 and 322) heated at a high temperature, a magnetic field is generated from a quantum energy generation unit (310) and the first and second heating members (311 and 312), quantum energy generated in a zero magnetic field state caused by an extinguishment of the magnetic field is irradiated, and the thermal electrons discharged from the heated negative electrodes (321 and 322) are accelerated in a direction of the positive electrodes (331 and 332) by electrical attraction, thereby allowing the steam and the fly ash particles to come into contact with each other or to be mixed with each other while causing a hydration reaction, so that main components of the glassy membrane coated on the surface of the fly ash particles, which include silicon dioxide ($SiO_2$), calcium oxide (CaO), sodium oxide ($Na_2O$), magnesium oxide (MgO), potassium oxide ($K_2O$) and barium oxide (BaO), are converted into basic materials including silicon hydroxide ($Si(OH)_4$), calcium hydroxide ($Ca(OH)_2$), sodium hydroxide (NaOH), barium hydroxide ($Ba(OH)_2$), magnesium hydroxide ($Mg(OH)_2$) and aluminum hydroxide ($2Al(OH)_3$), and configured to remove unburned carbon and more efficiently remove the glassy membrane by activating the thermal electrons discharged from the surfaces of the heating members and the negative electrodes through quantum energy generated in a zero magnetic field state in which magnetic fields are overlapped and extinguished at the center of the fluid passage;

an electrochemical reaction part (400) in which a discharge electrode (411) and a ground electrode (412) of a discharge unit (410), which is provided therein with a plurality of heating members (411 and 412) of the quantum energy generator (410) wound in opposite directions to each other and insulated from each other, are installed inside a housing (401) to face each other, each one side of the discharge electrode (411) and the ground electrode (412) is connected to a shaft (415) and passes through the housing (401) so as to be connected to a driving motor (416) installed in an external holder, each brush (433) connected to a shaft (432) of a driving motor (431) of a dedusting unit (430) is installed to come into surface contact with a lower part of the discharge electrode (411) and the ground electrode (412), power suppliers (421a and 422a) supply power to the heating members (421 and 422) of the quantum energy generator (410) installed inside the discharge electrode (411) and the ground electrode (412) while being insulated from each other to generate heat while forming a magnetic field at an angle of 90° C. with respect to a direction of current flow to heat the discharge electrode (411) and the ground electrode (412) in a thermal conductive manner at 500° C., which is an ignition temperature of unburned pulverized coal, or more, thereby generating thermal electrons from the surfaces of the two electrodes (411 and 412), the motor (416) connected to the two electrodes by the shaft (415) is driven, so that the two electrodes (411 and 412) are rotated while engaging with each other in opposite directions at a predetermined interval, a high voltage generated from a high-voltage generator (413) is applied to the discharge electrode (411) and the ground electrode (412) through a conducting wire to start discharge between the two electrodes (411 and 412), thereby forming a high electric field energy (5 eV-5 KeV) band, which is larger than a work function (eV)(1.1 eV-5.0 eV) of main components of a glassy membrane coated on the surface of the fly ash particles, which include silicon dioxide ($SiO_2$), calcium oxide (CaO), magnesium oxide (MgO), barium oxide (BaO), alumina ($Al_2O_3$), etc., air which is produced by absorbing and pressurizing the outside air in the compressed air feeder (440) is sprayed through the spray nozzle (446) onto the fly ash introduced between the two electrodes (411 and 412), so that the fly ash and the air are mixed together to give an air void (gap) between the fly ash particles to facilitate an elastic collision between the thermal electrons and spherical (ball-shaped) fly ash particles, the fly ash particles are subject to the elastic collision with charged particles including electrons, ions or the like, and thermal electrons discharged during a discharge process in the high electric field energy band formed between the two electrodes (411 and 412), a magnetic field generated when power is supplied to the heating members (421 and 422) of the quantum energy generator (410) extends retention time of the charged particles including electrons, ions or the like, and thermal electrons in the two electrodes (411 and 412), magnetic fields generated in opposite directions to each other in a structure, in which the heating members (421 and 422) are wound in opposite directions to each other, are overlapped and extinguished so that the quantum energy generated in a zero energy state is irradiated to activate the charged particles including the electrons, ions or the like, and thermal electrons and to increase a number and intensity of elastic collisions with the fly ash particles, thereby removing the glassy membrane covering the surface of the fly ash particles once again after the thermal decomposition part, while removing air pollutants such as sulfur oxides ($SO_X$), etc., through oxidation and reduction reactions at the same time by dissociating components of air contained in the fly ash particles, which include oxygen ($O_2$), vapor ($H_2O$) and sulfur oxides ($SO_X$) and generating oxygen ion (O), hydrogen proton ($H^+$) and hydroxyl ion ($OH^-$), unburned carbon, which is not removed by the thermal decomposition part (300), comes into contact with the surfaces of the two electrodes (411 and 412) heated at a high temperature, and is heated, so that the unburned carbon is naturally burned under an oxygen atmosphere (oxygen or ionized oxygen ions in air contained in the fly ash), and becomes the unburned pulverized coal while generating carbon monoxide (CO) or carbon dioxide ($CO_2$) through the combustion reaction, the combustion reaction is progressed by spark or flame generated between the discharge electrode (421) and the ground electrode (422) during the discharge operation to generate carbon monoxide (CO) or carbon dioxide ($CO_2$) so that the unburned pulverized coal is removed once again after the thermal decomposition part, and a motor (431) connected by a shaft with a brush (433) rotating in opposite direction to the discharge electrode (411) and the ground electrode (412) is driven to eliminate the fly ash particles attached onto the discharge electrode (411) and the ground electrode (412);

a second reservoir (500) including a hopper (501) for temporarily storing the fly ash finally treated in the electrochemical reaction part (400) and configured to feed and store the fly ash into the storage tank (507) through rotation of a screw (505) and compressed air, which is pressurized and fed from the blower (503), if a motor (506) installed at one side of the discharge pipe (504) is driven to rotate the screw (505) connected to a motor shaft (506) while feeding the air pressurized by the blower (503) to the discharge pipe (504), and then if a motor-operated rotary valve (502) attached to a lower part of the hopper (501) is open to send the fly ash stored in the hopper (501) to the discharge pipe (504); and a control panel (600) configured to play a controlling role, such as supplying power to and shutting off power from the first reservoir (100), the feeder (200), the thermal decomposition part (300), the electrochemical reaction part (400) and the second reservoir (500) through data which are measured in real time by a sensor (not shown) installed in the first reservoir (100), the feeder (200), the thermal decomposition part (300), the electrochemical reaction part (400) and the second reservoir (500) and transmitted to the control part.

Advantageous Effects

An apparatus for recycling fly ash having a quantum energy generator therein according to the present invention may recycle fly ash by removing the unburned pulverized coal out of the fly ash, without a need for a surfactant to secure an air void and a large amount of an AE agent to secure a slump, which are required for using the fly ash as an alternative material for cement.

Further, the apparatus may remove a glassy membrane of the surface of the fly ash, thereby solving a problem of latent hydraulic property, which does not directly react with water.

Moreover, in case of manufacturing concrete by using the fly ash, the amount of cement used may be reduced and thus the amount of carbon dioxide generated from a process of manufacturing cement as well as the cost of manufacturing may be reduced as much as the amount of cement used is reduced. Furthermore, it is possible to achieve an effect of improving performance, such as more convenient construction due to an increase in fluidity, better long-term strength, more chemical durability and the like.

Furthermore, the combustion wastes generated from a combustion process of thermal power plants, etc. may be recycled into resources.

DESCRIPTION OF DRAWINGS

FIG. 1 is a schematic view showing an apparatus for recycling fly ash having a quantum energy generator therein according to the present invention.

FIG. 2 is a sectional view showing a first reservoir of FIG. 1.

FIG. 3 is a sectional view showing a feeder of FIG. 1.

FIG. 4*a* is a sectional view showing a thermal decomposition part of FIG. 1.

FIG. 4*b* is a sectional view showing a steam feeder of FIG. 4*a*.

FIG. 5 is a sectional view showing an electrochemical reaction part of FIG. 1.

FIG. 6*a* is a sectional view showing a high-voltage discharge unit of FIG. 5.

FIG. 6*b* is a sectional view showing a quantum energy generator of FIG. 5.

FIG. 6*c* is a sectional view showing a dedusting unit of FIG. 5.

FIG. 6*d* is a sectional view showing a compressed air feeder of FIG. 5.

FIG. 7 is a sectional view showing a second reservoir of FIG. 1.

FIG. 8 is a sectional view showing a control panel of an apparatus for recycling fly ash having a quantum energy generator therein according to the present invention.

BEST MODE

With reference to the accompanying drawings, embodiments of the present invention will be described in detail as follows such that those skilled in the art to which the present disclosure pertains may easily practice the present invention.

FIG. 1 is a schematic view showing an apparatus for recycling fly ash having a quantum energy generator therein according to the present invention.

Referring to FIG. 1, the apparatus for recycling fly ash having a quantum energy generator therein may include a first reservoir 100, a feeder 200, a thermal decomposition part 300, an electrochemical reaction part 400, a second reservoir 500 and a control panel 600.

To describe in more detail, the first reservoir 100 may be installed at a rear end of a boiler of a thermal power plant and may be configured to transport the fly ash collected from an electric dust collector by using a tank lorry 101, after the fly ash is exhausted from the coal burned in the boiler, and feed and store the fly ash into a storage tank 104 through a feeding pipe 103 by connecting an outlet line of a blower 102 attached to a vehicle body to an inlet of a feeding pipe, driving the blower 102 to feed the pressurized air to one side of the feeding pipe.

The feeder 200 may be connected to the storage tank 104 and configured to feed air pressurized from a blower 201 installed at one side of a feeding pipe into a discharge pipe 202 and drive a motor-operated rotary valve 105 installed at a lower part of the storage tank 104 to feed the fly ash stored in the first reservoir 100 to the feeding pipe, and configured to drive a driving motor 204 connected with a screw 203 installed inside the feeding pipe 202 by a shaft to rotate a driving motor 204, thereby discharging the fly ash introduced in the feeding pipe into a discharge port 205 connected to a thermal decomposition part 300.

The thermal decomposition part 300 may include: a quantum energy generator 310 including a first heating member 311, a second heating member 311 and a power supplier 313; a negative electrode 320 including a first negative electrode 321 and a second negative electrode 322; a positive electrode 330 including a first positive electrode 331 and a second positive electrode 332; and a steam feeder 340 including a wet steam generator 341, a feeding pipe 342 and a chamber 344, or a high-frequency induction heater 343*a*, an electromagnetic valve 345 and a spray nozzle 346; and each power supplier thereof, and may be configured to discharge thermal electrons from surfaces of heating members and negative electrodes by heating the heating members and the negative electrodes at a high temperature of 500° C. or higher by supplying DC power to a plurality of heating members 311 and 312 of a quantum energy generator and the negative electrodes 321 and 322, configured to accelerate by electrical attraction the thermal electrons discharged from the surfaces of the plurality of heating members 311 and 312 of the quantum energy generator 310 and the negative electrodes 321 and 322, which are heated by giving a potential difference between DC power suppliers 311*a* and 312*a* for the plurality of heating members 311 and 312 of the quantum energy generator 310 and DC power suppliers 321*a* and 322*a* for the negative electrodes 321 and 322, and between DC power suppliers for negative electrodes 321*a* and 322*a* and DC power suppliers for positive electrodes 331*a* and 332*a*, configured to primarily remove a glassy membrane of fly ash particles in a process of increasing a number of elastic collisions with the fly ash particles passing through a fluid passage formed between negative electrodes 321 and 322 and positive electrodes 331 and 332 by extending retention time of the thermal electrons discharged from the surfaces of the heating members 311 and 312 and the negative electrodes 321 and 322 by a magnetic field generated at an angle of 90 degrees with respect to a direction of current flow by supplying power to the plurality of heating members 311 and 312 of the quantum energy generator 310, which are wound in opposite directions to each other, from the DC power suppliers 311a and 312a, configured to primarily remove unburned pulverized coal while generating carbon monoxide (CO) or carbon dioxide $CO_2$) through a combustion reaction, in which the unburned pulverized coal out of the fly ash comes into contact with the surfaces of the negative electrodes, heated at a high temperature, is heated at 500° C., which is an ignition point of carbon (C), or higher, under an oxygen atmosphere (oxygen in air contained in the fly ash), configured to secondarily remove the glassy membrane coated on the fly ash particles by allowing the carbon dioxide ($CO_2$) generated from the process of removing unburned pulverized coal to react with main components of the glassy membrane coated on the fly ash particles, which include calcium oxide (CaO), sodium oxide ($Na_2O$), magnesium oxide (MgO), potassium oxide ($K_2O$) and barium oxide(BaO), thereby generating carbonates such as calcium carbonate ($CaCO_3$), sodium carbonate ($Na_2CO_3$), magnesium carbonate ($MgCO_3$), potassium carbonate ($K_2CO_3$), barium carbonate ($BaCO_3$), etc., configured to thirdly remove the glassy membrane by spraying superheated steam generated from a steam feeder 340 onto the fly ash introduced through the spray nozzle 346 in an environment in which magnetic fields are generated from the first and second heating members 311 and 312, quantum energy generated in a zero magnetic field state caused by an extinguishment of the magnetic fields is irradiated, and the thermal electrons generated from the surfaces of negative electrodes 321 and 322 are accelerated in a direction of the positive electrodes 331 and 332 by electrical attraction, thereby allowing the steam and the fly ash particles to come into contact with each other or to be mixed with each other while causing a hydration reaction, so that main components of the glassy membrane coated on the surface of the fly ash particles, which include silicon dioxide ($SiO_2$), calcium oxide (CaO), sodium oxide ($Na_2O$), magnesium oxide (MgO), potassium oxide ($K_2O$) and barium oxide (BaO), are converted into basic materials including silicon hydroxide ($Si(OH)_4$), calcium hydroxide ($Ca(OH)_2$), sodium hydroxide (NaOH), barium hydroxide ($Ba(OH)_2$), magnesium hydroxide ($Mg(OH)_2$) and aluminum hydroxide ($2Al(OH)_3$), and configured to feed the fly ash with the glassy membrane removed therefrom into an electrochemical reaction part 400 by a gravitational difference.

The electrochemical reaction part 400 may include a housing 401, a high-voltage discharge unit 410, a quantum energy generator 420, a dedusting unit 430 and a compressed air feeder 440, in which a discharge electrode 411 and a ground electrode 412 of a discharge unit 410, which is provided therein with a plurality of heating members 411 and 412 of the quantum energy generator 410 wound in opposite directions from each other and insulated from each other, are installed inside a housing 401 to face each other, each one side of the discharge electrode 411 and the ground electrode 412 is connected to a shaft 415 and passes through the housing 401 so as to be connected to a driving motor 416 installed in an external holder, power suppliers 421a and 422a supply power to the heating members 421 and 422 of the quantum energy generator 410 installed inside the discharge electrode 411 and the ground electrode 412 while being insulated from each other to generate heat while forming a magnetic field at an angle of 90° C. with respect to a direction of current flow to heat the discharge electrode 411 and the ground electrode 412 at 500° C., which is an ignition temperature of unburned pulverized coal, or more, the motor 416 connected to the discharge electrode 411 and the ground electrode 412 by the shaft 415 is driven, so that the discharge electrode 411 and the ground electrode 412 are rotated while engaging with each other in opposite directions at a predetermined interval, outside air is absorbed and pressurized in an air feeder 440, so that the fed air is sprayed onto the discharge electrode 411 and the ground electrode 412 through a spray nozzle 446 installed above the discharge electrode 411 and the ground electrode 412 while being spaced apart from the discharge electrode 411 and the ground electrode 412, thereby mixing the fly ash particles and the sprayed air to give an air void between the fly ash particles (a distance between particles), a high voltage generated from a high-voltage generator 413 is supplied to the discharge electrode 411 and the ground electrode 412 through a conducting wire 414 to form a high electric field energy (5 eV-5 KeV) band between the two electrodes 411 and 412, which is larger than a work function (eV) (1.1 eV-5.0 eV) of main components of the glassy membrane, which include silicon dioxide ($SiO_2$), calcium oxide (CaO), sodium oxide ($Na_2O$), magnesium oxide (MgO), potassium oxide ($K_2O$) and barium oxide (BaO), air which is produced by absorbing and pressurizing the outside air in the compressed air feeder 440 is sprayed through the spray nozzle 446 onto the fly ash introduced between the two electrodes 411 and 412, so that the fly ash and the air are mixed together to give the air void (gap) between the fly ash particles to facilitate an elastic collision between the thermal electrons and spherical (ball-shaped) fly ash particles, the fly ash particles are subject to the elastic collision with charged particles including electrons, ions or the like, and thermal electrons discharged during a discharge process in the high electric field energy band formed between the two electrodes 411 and 412, magnetic fields generated when power is supplied to the heating members 421 and 422 of the quantum energy generator 410 extends retention time of the charged particles including electrons, ions or the like, thermal electrons in the two electrodes 411 and 412, and magnetic fields generated in opposite directions to each other in a structure, in which the heating members 421 and 422 are wound in opposite directions to each other, are overlapped and extinguished, so that the quantum energy generated in a zero energy state is irradiated to activate the charged particles including the electrons, ions or the like, and thermal electrons and to increase a number and intensity of elastic collisions with the fly ash particles, thereby removing the glassy membrane coated on the fly ash particles once again after the thermal decomposition part, and unburned carbon, which is not removed by the thermal decomposition part 300, comes into contact with the surfaces of the two electrodes 411 and 412 heated at a high temperature, and is heated, so that the unburned carbon is naturally burned under an oxygen atmosphere (oxygen or ionized oxygen ions in air contained in the fly ash), and becomes the unburned pulverized coal while generating carbon monoxide (CO) or carbon dioxide ($CO_2$) through the combustion reaction, or becomes the unburned pulverized coal while generating carbon monoxide (CO) or carbon dioxide ($CO_2$) in such a way that the combustion reaction is progressed by spark or flame generated between the discharge electrode 421) and the ground electrode 422 during the discharge operation, or the unburned pulverized coal is removed once again after the thermal decomposition part through a combustion reaction caused by natural ignition under an oxygen atmosphere and the combustion reaction caused by an ignition source generated by a discharge reaction. Further, carbon dioxide ($CO_2$) generated from the process of removing the unburned pulverized coal is reacted with main components of the glassy membrane coated on the fly ash particles, which are not removed by the elastic collision between the fly ash particles and the charged particles including electrons, ions or the like, and the thermal electrons in a high electric field area formed between the two electrodes 411 and 412, which include calcium oxide (CaO), sodium oxide ($Na_2O$), magnesium oxide (MgO), potassium oxide ($K_2O$) and barium oxide (BaO), so that calcium oxide (CaO) is converted into calcium carbonate ($CaCO_3$), sodium oxide ($Na_2O$) is converted into sodium carbonate ($Na_2CO_3$), magnesium oxide (MgO) is converted into magnesium carbonate ($MgCO_3$), potassium oxide ($K_2O$) is converted into potassium carbonate ($K_2CO_3$), and barium oxide (BaO) is converted into barium carbonate ($BaCO_3$), thereby removing the glassy membrane once again after the thermal decomposition part. After that, a motor 431 connected by a shaft to a brush 433 rotating in opposite direction to the discharge electrode 411 and the ground electrode 412 is driven to eliminate the fly ash particles attached onto the discharge electrode 411 and the ground electrode 412, so that the resulting fly ash is fed into a hopper 501 of a second reservoir 500;

The second reservoir 500 may include the hopper 501 for temporarily storing the fly ash finally treated in the electrochemical reaction part 400 and may be configured to feed and store the fly ash into the storage tank 507 through rotation of a screw 505 and compressed air, which is fed after being pressurized from the blower 503, if a motor 506 installed at one side of the discharge pipe 504 is driven to rotate the screw 505 connected by a shaft to a motor 506 while feeding the air pressurized by the blower 503 to the discharge pipe 504, and then if a motor-operated rotary valve 502 attached to a lower part of the hopper 501 is open to send the fly ash stored in the hopper 501 to the discharge pipe 504.

A control panel 600 may play a controlling role, such as supplying power to and shutting off power from the first reservoir 100, the feeder 200, the thermal decomposition part 300, the electrochemical reaction part 400 and the second reservoir 500 through data, which are measured in real time by sensors (not shown) installed in the first reservoir 100, the feeder 200, the thermal decomposition part 300, the electrochemical reaction part 400 and the second reservoir 500 and transmitted to the control part.

FIG. 2 is a sectional view showing a first reservoir of FIG. 1.

Referring to FIG. 2, the first reservoir 100 may include a tank lorry 101, a blower 102, a feeder 103, a storage tank 104 and a dust collector 105.

The first reservoir 100 may be installed at a rear end of a boiler of a thermal power plant and may be configured to transport the fly ash collected from an electric dust collector by using a tank lorry 101, after exhaust gas is collected from the coal burned in the boiler and separated by particle size, configured to pneumatically pressurize the fly ash stored in the tank lorry 101 and feed the resulting fly ash into the storage tank 104 by feeding high-pressure air into a feeding pipe 103, in which this high pressure air is generated by subsequently connecting a feeding pipe 103 with a discharge pipe of the tank lorry, opening a valve (not shown) and driving a blower 102 attached to a vehicle body 101, and configured to feed and store the fly ash of the tank lorry 101 into the storage tank while filtering and collecting the fly ash exhausted and floating in the air, by installing a stationary back-filter unit 106 at one side of a upper part of the storage tank in order to prevent an increase in an internal pressure of the storage tank 104.

The blower 200 may include at least one suitable for field, selected from a ring blower, a turbo blower, a turbo FAN and an air compressor.

A filter medium of the back-filter unit 106 installed at an upper part of the storage tank 104 may include a high-performance filter of a HEPA filter or higher capable of sufficiently collecting the scattering fly ash.

A material of the storage tank 104 may include a universal material such as carbon steel (SS400), stainless steel (STS304), etc.

FIG. 3 is a sectional view showing a feeder of FIG. 1.

Referring to FIG. 3, the feeder 200 may be connected to the storage tank 104 and may be configured to feed air pressurized by driving a blower 201 installed at one side of a feeding pipe 202 into the feeding pipe 202, configured to feed the fly ash stored in the storage tank 104 of the first reservoir 100 into the feeding pipe 202 by driving a motor-operated rotary valve 105 installed at a lower part of the storage tank 104, and configured to rotate a screw 203 connected with the motor by a shaft, if a motor 204 is driven in a state in which the screw 203 is installed inside the feeding pipe 202 and connected with the motor 204 by a shaft 02, so that the fly ash introduced in the feeding pipe 203 is discharged to a discharge port 205 and fed into a thermal decomposition part 300 by a gravitational difference.

FIG. 4a is a sectional view showing a thermal decomposition part of FIG. 1.

Referring to FIG. 4a, the thermal decomposition part 300 may include a quantum energy generator 310 having a first heating member 311, a second heating member 311 and power suppliers 311a and 312a, a negative electrode 320 having a first negative electrode 321, a second negative electrode 322 and power suppliers 421a and 322a, a positive electrode 330 having a first positive electrode 331, a second positive electrode 332 and power suppliers 331a and 332a, and a steam feeder 340 having a steam generator 341, a feeding conduit 342, a burner 343, a chamber 344, an electromagnetic valve 345 and a spray nozzle 346 or having a steam generator 341, a power supplier 341a, a conducting wire 342a, a high-frequency induction heating coil 343a, an electromagnetic valve 345 and a spray nozzle 346.

LayOut

A shape of the housing may be selected from a cylindrical shape or a cuboid shape.

Further, the quantum energy generator 310 may include the first heating member 311 and the DC power supplier 311a for the first heating member 311, the second heating member 312 and the DC power supplier 312a for the second heating member 312, and a conducting wire for supplying DC power to the first and second heating members.

Moreover, if power is supplied to the first and second heating members 311 and 312 from the DC power suppliers 311a and 312a while the first heating member 311 and the second heating member 312 of the quantum energy generator 310 are wound in opposite directions to each other, heat may be generated while a magnetic field is generated at an angle of 90 degrees with respect to a direction of current flow.

The first negative electrode 321 may be installed at a left side or a right side inside the housing 301 and the first heating member 311 of the quantum energy generator 310 may be installed therein while being spaced apart from each other. Further, the first negative electrode 321 may be connected to the DC power supplier 321a.

The second negative electrode 322 may be installed at a left side or a right side inside the housing 301 in an opposite direction to the first negative electrode 321, and the second heating member 312 of the quantum energy generator 310 may be installed therein while being spaced apart from each other. Further, the second negative electrode 322 may be connected to the DC power supplier 322a.

The first positive electrode 331 may be installed at the center of the inside of the housing 301 while being spaced apart from the first negative electrode 311 at a predetermined interval, and connected to the DC power supplier 331a.

The second positive electrode 332 may be installed at the center of the inside of the housing 301 while being spaced apart from the second negative electrode 312 at a predetermined interval, and connected to the DC power supplier 332a.

Further, the first positive electrode 331 and the second positive electrode 332 may be installed to come into surface contact with each other at the center of the housing 301 while being insulated from each other through an insulator.

Moreover, the DC power suppliers 311a and 312a for the first and second heating members 311 and 312 of the quantum energy generator 310, the DC power suppliers 321a and 322a for the first and second negative electrodes, and the DC power suppliers 331a and 332a for the first and second positive electrodes may be installed in a holder (not shown) which is separately installed outside the housing 301.

Furthermore, a fluid passage, through which the fly ash passes, may be formed between the first negative electrode 321 and the second positive electrode 331, and between the second negative electrode 322 and the second positive electrode 332.

Materials or Classifications

A material of the main body may include at least one selected from tungsten (W), tantalum (Ta), hastelloy and stainless steel (STS304).

A material of the first and second heating members 311 and 312 of the quantum energy generator 310 may include at least one selected from tungsten, carbon, boron compound and titanium material.

A material of the first negative electrode 321 and the second negative electrode 422 may include at least one selected from aluminum (Al), titanium (Ti), chromium (Cr), nickel (Ni), silver (Ag), molybdenum (Mo), tungsten (W), platinum (Pt), copper (Cu), palladium (Pd), carbon (C) and iron (Fe).

A material of the first positive electrode 331 and the second positive electrode 332 may include at least one selected from titanium (Ti), chromium (Cr), nickel (Ni), silver (Ag), molybdenum (Mo), tungsten (W), platinum (Pt), copper (Cu), palladium (Pd) and Rh (rhodium).

The surfaces of the first negative electrode 321 and the second negative electrode 322 may be shaped to have a plurality of sharp protrusions thereon or have a protrusion part installed therein, so that electric charges may be concentrated thereon when the negative electrode is heated at a high temperature and DC power is supplied from outside, and also coated with at least one selected from catalytic materials for promoting the release of thermal electrons, such as barium oxide (BaO), strontium oxide (SrO), calcium oxide (CaO), etc., and titanium dioxide ($TiO_2$), rhodium (Rh), platinum (Pt), palladium (Pd), ruthenium (Ru), zinc (Zn), zirconium (Zr), hafnium, vanadium ($V_2O_5$), niobium, tungsten (W), iron (Fe), ruthenium oxide ($RuO_2$ and $RuO_4$), rhodium oxide (RhO), copper oxide (CuO), zinc oxide (ZnO), zirconium oxide ($ZrO_2$), silicon dioxide ($SiO_2$), titanium oxide ($TiO_2$), hafnium oxide ($HfO_2$), aluminum oxide ($Al_2O_3$), vanadium oxide (VO and $V_2O_3$), niobium oxide ($Nb_2O_5$), tungsten oxide (WO), manganese (Mn) and iron oxide (FeO), which remove materials such as nitrogen oxide (NOX), sulfur oxide (SOX), volatile organic compounds (VOCS), etc.

Method for Power Supply

If the first and second heating members 311 and 312 of the quantum energy generator 310 are wound in opposite directions to each other to form a solenoid coil shape and the DC power generated from the DC power suppliers 311a and 312a is supplied thereto, the heating members may generate heat while magnetic fields are generated at an angle of 90 degrees with respect to a direction of current flow. Then, heating may be carried out at 500° C. or higher so that the surfaces of the heating members 311 and 312 and the first and second negative electrodes 321 and 322 may receive energy enough to overcome a work function of a material (metal) and thus to discharge thermal electrons from the surfaces thereof. Further, the surfaces of the first and second negative electrodes 321 and 322 are to be sufficiently heated at 500° C. or higher so that the unburned pulverized coal out of the fly ash coming into contact with the surfaces may be heated at an ignition point (500° C. or higher) or higher to cause a combustion reaction, in which such unburned pulverized coal is naturally burned under an oxygen atmosphere (oxygen in aid contained in the fly ash).

The first negative electrode 321 may receive power from the DC power supplier 321a and the second negative electrode 322 may receive power from the DC power supplier 322a.

A + terminal at an output side of the DC power supplier 321a may be connected to the first negative electrode 321, a − terminal at an output side thereof may be connected to a − terminal at an output side of the DC power supplier 311a for the first heating member 311, a + terminal at an output side of the DC power supplier 322a may be connected to the second negative electrode 322, and a − terminal at an output side thereof may be connected to a − terminal at an output side of the DC power supplier 312a for the second heating member 312, so that the thermal electrons discharged by heating at a high temperature the surfaces of the first and second heating members 311 and 312 of the quantum energy generator 310 may be accelerated toward the first and second negative electrodes 321 and 322 by electrical attraction.

Further, to increase an accelerating force of the thermal electrons discharged from the first and second heating members 311 and 312, a voltage at an output side of the DC power suppliers 321a and 322a for the first and second negative electrodes 321 and 322 is to be increased by an amount of voltage selected from a range of 1 to 10 KV compared to an output voltage of the DC power suppliers 311a and 312a for the first and second heating members 311 and 312 of the quantum energy generator 310.

The surfaces of the first and second heating members 311 and 312 of the quantum energy generator 310 are to be heated at a high temperature so that the thermal electrons discharged therefrom are added and accelerated with an increase in electrical attraction as much as an amount of a potential difference supplied to the first and second negative electrodes 321 and 322 and the thermal electrons may be discharged from the surfaces of the negative electrodes 321 and 322 in a collision process with the first negative electrode 321 and the second negative electrode 322, respectively. The surfaces of the first and second negative electrodes 321 and 322 are to be heated at 500° C. or higher so that the unburned pulverized coal out of the fly ash coming into contact with the surfaces may be naturally burned under an oxygen atmosphere (oxygen or ionized oxygen ions in air contained in the fly ash) and may be removed while generating carbon monoxide (CO) or carbon dioxide ($CO_2$) through a combustion reaction.

Further, the first positive electrode 331 may receive power from the DC power supplier 331a and the second positive electrode 332 may receive power from the DC power supplier 332a.

A + terminal at an output side of the DC power supplier 331a may be connected to the first positive electrode 331, a − terminal at an output side thereof may be connected to a − terminal at an output side of the DC power supplier 321a for the first heating member 321, a + terminal at an output side of the DC power supplier 332a may be connected to the second positive electrode 332, and a − terminal at an output side thereof may be connected to a − terminal at an output side of the DC power supplier 322a for the second negative electrode 322, so that the thermal electrons discharged from the surfaces of the first negative electrode 311 and the second negative electrode 312 may be accelerated in a direction of the first and second positive electrodes 331 and 332 by electrical attraction.

Further, to increase an accelerating force of the thermal electrons discharged from the first and second negative electrodes 321 and 322 by electrical attraction, a voltage at an output side of the DC power suppliers 331a and 332a for the first and second positive electrodes 331 and 332 is to be increased as much as an amount of voltage selected from a range of 1 to 10 KV compared to an output voltage of the DC power suppliers 321a and 322a for the first and second negative electrodes.

In addition, the thermal electrons, which are discharged from the surfaces of the first and second negative electrodes 321 and 322 due to a potential difference between the DC power suppliers 321a and 331a and between the DC power suppliers 322a and 332a, may be accelerated in a direction of the first and second positive electrodes 331 and 332 as much as an amount of electrical attraction increased, thereby increasing an intensity of elastic collisions with the fly ash particles passing through a fluid passage formed between the first negative electrode 321 and the first positive electrode 331 and between the second negative electrode 322 and the second positive electrode 332, so that it may become more easier to remove main components of the glassy membrane coated on the surface of the fly ash particles, which include materials such as silica, or silicon dioxide ($SiO_2$), sodium oxide ($Na_2O$), calcium oxide (CaO), potassium oxide ($K_2O$) and zinc oxide (ZnO), magnesium oxide (MgO), barium oxide (BaO), alumina ($Al_2O_3$), etc.

Furthermore, each magnetic field generated in a direction of 90 degrees with respect to a direction of current flow caused by the current flow of the first and second heating members 311 and 312 of the quantum energy generator 310, which are wound in opposite directions to each other, may extend retention time of thermal electrons discharged from the surface of the first negative electrode 321 and accelerated toward the first positive electrode 331, may extend retention time of thermal electrons discharged from the surface of the second negative electrode 322 and may be accelerated toward the second positive electrode 332, and may increase a number of elastic collisions with the fly ash particles passing through a fluid passage formed between the first negative electrode 321 and the first positive electrode 331 and between the second negative electrode 322 and the second positive electrode 332, thereby improving a rate of removing a glassy membrane from the surface of the fly ash particles, so that the magnetic fields generated from the first and second heating members 311 and 312 of the quantum energy generator 310 may be overlapped and extinguished, and quantum energy generated in a zero magnetic field state may be irradiated to activate thermal electrons, thereby further improving the rate of removing a glassy membrane from the surface of the fly ash.

An amount of the thermal electrons discharged may be increased as the negative electrodes 321 and 322 are heated at a higher temperature, as a current density is increased, and as a material of the negative electrodes 321 and 322 includes a metal having a less work function energy.

Thus, a material of the negative electrodes 321 and 322 used in the present invention may include at least one selected from molybdenum (Mo: 4.36-4.93 eV), titanium (Ti: 4.33 eV), tungsten (W: 4.32-5.22 eV), manganese (Mn: 4.1 eV), carbon compound (C: 5.0 eV) and compounds such as iron (Fe: 4.67-4.81 eV), etc., which have a less value of the work function (electron volt: eV).

If DC power is supplied from the DC power suppliers 311a and 312a to the first and second heating members 311 and 312 of the quantum energy generator 310, pre-wound in opposite directions to each other, while the fly ash remained after filtering out the fly ash particles having a particle size of 50 μm or more as well as impurities through a granularity separator (not shown) is transported through a feeder 200 to a fluid passage formed between the first negative electrode 321 and the first positive electrode 331 and between the second negative electrode 322 and the second positive electrode 332, which are installed at one side of the inside of the housing 301, a magnetic field may be generated in a direction of 90 degrees with respect to current flow to heat the first heating member 311, so that thermal electrons may be discharged from the surface thereof. Then, when a potential difference is given between the DC power supplier 311a for the first heating member 311 and the DC power supplier 321a for the first negative electrode 321, and when a potential difference is given between the DC power supplier 321a for the first negative electrode 321 and the DC power supplier 331a for the first positive electrode 331, the thermal electrons discharged from the surface of the first heating member 311 may be accelerated in a direction of the first negative electrode 321, while the thermal electrons generated from the surface of the first negative electrode 321 may be accelerated in a direction of the first positive electrode 331, thereby hitting the fly ash particles containing air, when passing through a fluid passage formed between the first negative electrode 321 and the first positive electrode 331. Then, the constituent molecules of air in the fly ash particles, which include oxygen molecule ($O_2$), vapor ($H_2O$), nitrogen molecule ($N_2$) and sulfur oxide (SOX), may be dissociated to generate oxygen ion (O), hydrogen proton (H+), hydroxyl ion (OH−) and nitrogen ion (N), remove sulfur oxide (SOX) and nitrogen oxide (NOX) through an oxidation and reduction reaction with the generated oxygen ion (0) and hydrogen proton (H+), so that the unburned pulverized coal out of the fly ash may come into contact with the surfaces of the negative electrodes 321 and 322 heated at 500° C. or higher and may be heated at 500° C., which is an ignition point of carbon (C), or higher, and naturally burned under an oxygen atmosphere (oxygen in air contained in the fly ash) to generate carbon monoxide (CO) or carbon dioxide ($CO_2$) through a combustion reaction, thereby primarily removing the unburned pulverized coal, and combustion reaction formulas thereof are as shown in the following formulas 1, 2 and 3.

$$C+O_2 \rightarrow CO_2+97000 \text{ cal} \quad \text{[Combustion Reaction Formula 1]}$$

$$C+CO_2 \rightarrow 2CO+38800 \text{ cal} \quad \text{[Combustion Reaction Formula 2]}$$

$$2C+O_2 \rightarrow 2CO+58800 \text{ cal} \quad \text{[Combustion Reaction Formula 3]}$$

(Source: Practice on Heat Control. Published by Jinmunsa, Written by Yeong-su Kwon, et al.)

Further, carbon dioxide (CO2) generated from removing the unburned pulverized coal out of the fly ash particles through the combustion reaction above may be allowed to react with main components of the glassy membrane coated on the fly ash particles, which include calcium oxide (CaO), sodium oxide (Na$_2$O), magnesium oxide (MgO), potassium oxide (K$_2$O) and barium oxide (BaO), in a process of elastic collision between the fly ash particles and the thermal electrons discharged from the surfaces of the negative electrodes 321 and 322 heated, thereby generating carbonates such as calcium carbonate (CaCO$_3$), sodium carbonate (Na$_2$CO$_3$), magnesium carbonate (MgCO$_3$), potassium carbonate (K$_2$CO$_3$), barium carbonate (BaCO$_3$), etc., so as to primarily remove the glassy membrane coated on the fly ash particles, and the chemical reaction formulas thereof are as shown in the following reaction formulas 1, 2, 3, 4 and 5.

Calcium oxide (CaO) and Carbon dioxide (CO$_2$)

$$CaO+CO_2 \rightarrow CaCO_3 \quad \text{[Reaction Formula 1]}$$

Sodium Oxide (Na$_2$O) and Carbon Dioxide (CO$_2$)

$$Na_2O+CO_2 \rightarrow Na_2CO_3 \quad \text{[Reaction Formula 2]}$$

Magnesium Oxide (MgO) and Carbon Dioxide (CO$_2$)

$$MgO+CO_2 \rightarrow MgCO_3 \quad \text{[Reaction Formula 3]}$$

Potassium Oxide (K$_2$O) and Carbon Dioxide (CO$_2$)

$$K_2O+CO_2 \rightarrow K_2CO_3 \quad \text{[Reaction Formula 4]}$$

Barium Oxide (BaO) and Carbon Dioxide (CO$_2$)

$$BaO+CO_2 \rightarrow BaCO_3 \quad \text{[Reaction Formula 5]}$$

As shown above, the carbonates may be generated to remove the glassy membrane, but a main component of the glassy membrane, which includes silicon dioxide (SiO$_2$), may react with carbon at a high temperature of 1700° C. or higher, and thus may not be removed in the thermal decomposition part.

Further, to improve an efficiency of treating the fly ash, at least one selected from catalytic materials such as barium oxide (BaO), strontium oxide (SrO), calcium oxide (CaO), etc. may be applied to promote the release of thermal electrons from the surfaces of the negative electrodes 321 and 322 at a high temperature.

At least one selected from titanium dioxide (TiO$_2$), rhodium (Rh), platinum (Pt), palladium (Pd), ruthenium (Ru), zinc (Zn), zirconium (Zr), hafnium (Hf), vanadium (V2O5), niobium, tungsten (W), iron (Fe), ruthenium oxide (RuO$_2$ and RuO$_4$), rhodium oxide (Rh$_2$O$_3$), copper oxide (CuO), zinc oxide (ZnO), zirconium oxide (ZrO$_2$), silicon dioxide (SiO$_2$), titanium oxide (TiO$_2$), hafnium oxide (HfO$_2$), aluminum oxide (Al$_2$O$_3$), vanadium oxide (VO and V$_2$O$_3$), niobium oxide (Nb$_2$O$_5$), tungsten oxide (WO), manganese (Mn) and iron oxide (FeO) may be applied on the surfaces of the first and second positive electrodes 331 and 332, thereby improving an efficiency of treating materials such as carbon monoxide (CO), nitrogen oxide (NO$_x$), sulfur oxide (SOC), etc., which are already contained in the fly ash or are generated during a treatment process.

Further, a magnetic field generated by a flow of current in the second heating member 321 of the quantum energy generator 310, which is wound by the same method, may accelerate by electrical attraction the thermal electrons discharged from the surface heated at a high temperature in a direction of the second negative electrode 322, and may accelerate by electrical attraction the thermal electrons generated from the surface of the second negative electrode 322 in a direction of the second positive electrode 332, thereby hitting the fly ash particles passing through a fluid passage formed between the second negative electrode 322 and the second positive electrode 332.

In general, the thermal electrons generated from the first and second heating members 311 and 312 and the first and second negative electrodes may be subject to Lorentz Force (F) caused by distribution of an electric field vector (E) and a magnetic field vector (B) as shown in the following Equation 1.

$$F=q(E+v \times B) \quad \text{[Equation 1]}$$

Here, v is a velocity vector of a thermal electron.

At that time, a thermal electron having a very small mass has a very small radius of rotation caused by Lorentz Force, and thus comes to move "along with a magnetic line of force" and this phenomenon is called a magnetic confinement of an electron.

Further, the first heating member 321 and the second heating member 322 may be wound in opposite directions to each other, so that the directions of current flowing to the heating members 321 and 322 may be formed opposite to each other and magnetic fields generated according to the current flow may be disposed to work in opposite directions to each other, and thus the magnetic fields may be overlapped and canceled out at the center of the inside of the housing 301, that is, at an area where the first and second positive electrodes 331 and 332 of the fluid passage may be installed to come into surface contact with each other. In this case, an overall magnetic field may become zero. In fact, however, subtle energy (hereinafter, SE) may occur.

This SE is called Scalar energy, Non-Hertzian or the like as quantum energy, but is commonly called quantum energy.

The quantum energy generated as above may act as an additional energy source to activate thermal electrons and promote a dissociation action of gas-phase materials out of the fly ash, thereby improving an efficiency of treating the fly ash.

Further, the sources of the DC power supply 311a and 312a, which supply power to the first and second heating members 311 and 312 of the quantum energy generator 310, may refer to the first and second DC power suppliers 311a and 312a having a function of controlling the current of power supply therein, which may be one selected from a single-phase voltage source inverter (MPCC: model predictive current control) or a DC-DC converter, which is a combination of a PWM (pulse width modulation) control mode and a PFM (pulse frequency modulation) mode. If DC power is supplied from the first and second DC power suppliers 311a and 312a to the first and second heating members 311 and 312, the heating members 311 and 312 may generate heat to heat the first negative electrode 321 and the second negative electrode 322, which are installed to be spaced apart from each other, at an absolute temperature of 500° C. or higher, thereby discharging thermal electrons from the surfaces thereof. A set temperature may be adjusted through a control circuit input in a pre-programmed control panel 600 and a heating value of the heating members may be adjusted by controlling a current of DC power supplied to DC power suppliers 311a and 312a as shown in [Equation 2].

$$H=0.24\,I^2Rt \quad \text{[Equation 2]}$$

Here, H is calory (Kcal/h), I is current (A), R is resistance of a conductor (ohm), and t is a current carrying time (Sec).

Further, an intensity of magnetic field (magnetic flux density) may be adjusted as shown in [Equation 3].

$$B=2\pi knI \quad \text{[Equation 3]}$$

Here, B is an intensity of magnetic field, k is a magnetic constant ($K=2\times10^{-6}$ Tm/A), T is a number of coil windings, and I is current.

Further, an intensity of Lorentz Force may be adjusted as shown in [Equation 4].

$$F=BIl \quad \text{[Equation 4]}$$

Here, F is Lorentz Force, I is current, and l is a length of coil.

Further, the intensity of magnetic field may be used to adjust an amount of quantum energy generated at a zero-magnetic field state in which magnetic fields are overlapped between the first heating member 311 and the second heating member 312.

FIG. 4b is a sectional view showing a steam feeder of FIG. 4a.

Referring to FIG. 4b, the steam feeder 340 may include a steam generator 341, a feeding conduit 342, a burner 343, a chamber 344, an electromagnetic valve 345 and a spray nozzle 346 or includes a steam generator 341, a power supplier 341a, a conducting wire 342a, a high-frequency induction heating coil 343a, an electromagnetic valve 345 and a spray nozzle 346.

First, wet steam produced from the steam generator (boiler) 341 may receive inflammable gas or inflammable liquid fuel supplied through a fuel feeding pipe from the burner 343 connected to the fuel feeding pipe (not shown), then may receive air for combustion from an air leading-in pipe (not shown) while passing through the inside of the heating chamber 344 through the feeding pipe, then may be mixed with fuel, and then burned with spark released from a spark plug (not shown) to heat the steam supplied with wet steam at 200° C. or higher, thereby making superheated steam. After that, this superheated steam passes through the electromagnetic valve 345, may be supplied to the spray nozzle 346 installed at one side of the upper part of the inside of the thermal decomposition part, and may be sprayed onto the fly ash, which is transported from the feeder to the thermal decomposition part. Alternatively, the wet steam produced from the steam generator (boiler) 341 by supplying power to the high-frequency induction heating coil 343 wound by a certain number of coil windings on an external surface of another steam feeding pipe 344a from the power supplier 341 through the conducting wire 342 may be supplied to heat the steam supplied through the steam feeding pipe 344a at 200° C. or higher in a high-frequency induction heating manner, thereby making superheated steam. After that, this superheated steam may pass through the electromagnetic valve 345, then may be supplied to the spray nozzle 346 installed at one side of the upper part of the inside of the thermal decomposition part, and then may be sprayed onto the fly ash, which is transported from the feeder to the thermal decomposition part, so as to be mixed together while causing a hydrolysis reaction, thereby primarily removing main components of the glassy membrane covering the fly ash particles, which include silicon dioxide ($SiO_2$), calcium oxide (CaO), barium oxide (BaO), magnesium oxide (MgO), aluminum ($Al_2O_3$). Hydrolysis reaction formulas for each material are as shown in Equations 1, 2, 3, 4 and 5.

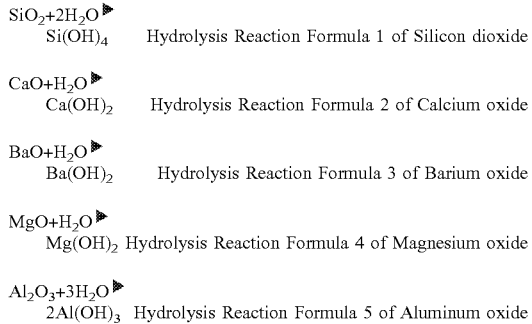

As above, the fly ash may be primarily treated in the thermal decomposition part and transported into the electrochemical reaction part 400 by a gravitational difference.

FIG. 5 is a sectional view showing an electrochemical reaction part of FIG. 1.

Referring to FIG. 5, the electrochemical reaction part 400 may include a housing 401, a high-voltage discharge (arc discharge) unit 410, a quantum energy generator 420, a dedusting unit 430 and a compressed air feeder 440.

The high-voltage discharge unit 410, the quantum energy generation unit 420 and the dedusting unit 430 may be installed inside the housing 401 of the electrochemical reaction part 400, while a pneumatic feeder 440, driving motors 416 and 431 and power suppliers 413, 421a and 422a may be installed outside thereof.

Further, a plurality of first indicator boards 402 may be installed above the discharge electrode 411 and the ground electrode 412 of the high-voltage discharge unit 410 inside the housing 401, a spray nozzle 446 connected with a pneumatic feeder 440 may be installed above the plurality of indicator boards 402 installed, and a plurality of anti-dusting plates 403 may be installed under the brush 435 of the dedusting unit 430.

FIG. 6a is a sectional view showing a high-voltage discharge unit of FIG. 5.

Referring to FIG. 6a, the high-voltage discharge unit 410 may include a discharge electrode 411 and a ground electrode 412, a high-voltage generator 413 and a conducting wire 414, a connecting shaft 415, a driving motor 416 and a gap-adjusting device of the two electrodes 411 and 412.

A shape of the discharge electrode 411 and the ground electrode 412 may be a cylindrical shape having a certain diameter, a first heating member 421 of the quantum energy generator 420 may be installed in a coil shape inside the discharge electrode 411 while being insulated from each other, and a second heating member 422 of the quantum energy generator may be installed therein in a coil shape while being insulated from each other. The first heating member 421 and the second heating member 422 of the quantum energy generator 420, having each coil shape, may be wound in opposite directions to each other.

Each one end of the discharge electrode 411 and the ground electrode 412 may be connected to a shaft, pass through the housing 401 and connected to a driving motor 416 installed outside.

One conducting wire 414 of an output line of the high-voltage generator 413 may be connected to one side of the discharge electrode 411, while the other conducting wire 414 thereof may be connected to one side of the ground electrode 412.

A shape of the discharge electrode 411 and the ground electrode 412 may include a cylindrical shape having a certain diameter and be processed to form a plurality of protrusions on an outside surface thereof, so that an electric field may be concentrated on the protrusion part, thereby improving a discharge efficiency.

The discharge electrode 411 and the ground electrode 412 may be installed in steps (in plurality) in a direction from top to bottom to face each other inside the housing 401.

A revolution per minute (RPM) of the driving motor 416 may be adjusted by a pre-programmed control circuit of a control panel 600.

When a high voltage generated from the high-voltage generator 413 may be applied to the discharge electrode 411 and the ground electrode 412 through the conducting wire 414 to start discharge between the two electrodes 411 and 412, a gap control may be performed by using a gap-adjusting device (not shown).

Further, coating may be performed with a least one selected from catalytic materials for promoting release of thermal electrons from the surfaces of the discharge electrode 411 and the ground electrode 412, such as barium oxide (BaO), strontium oxide (SrO), calcium oxide (CaO), etc., and mixed with at least one selected from titanium dioxide (TiO$_2$), rhodium (Rh), platinum (Pt), palladium (Pd), ruthenium (Ru), zinc (Zn), zirconium (Zr), hafnium, vanadium (V$_2$O$_5$), niobium, tungsten (W), iron (Fe), ruthenium oxide (RuO$_2$ and RuO$_4$), rhodium oxide (Rh$_2$O$_3$), copper oxide (CuO), zinc oxide (ZnO), zirconium oxide (ZrO$_2$), silicon dioxide (SiO$_2$), titanium oxide (TiO$_2$), hafnium oxide (HfO$_2$), aluminum oxide (Al$_2$O$_3$), vanadium oxide (VO and V$_2$O$_3$), niobium oxide (Nb$_2$O$_5$), tungsten oxide (WO), manganese (Mn) and iron oxide (FeO), which remove materials such as nitrogen oxide (NO$_X$), sulfur oxide (SO$_X$), volatile organic compounds (VOCS), etc.

If the control panel 600 supplies power to the driving motor 416, the driving motor 416 may be rotated, so that the discharge electrode 411 and the ground electrode 412 may be rotated to engage with each other while being spaced apart from each other. The air pressurized from the air feeder 440 may be sprayed through the spray nozzle 446 onto the discharge electrode 411 and the ground electrode 412 which are rotated to form an air void between the fly ash particles while being mixed with the fly ash particles introduced between the two electrodes 411 and 412. If power is supplied from the power suppliers 421a and 422a to the first heating member 421 and the second heating member 421 of the quantum energy generation unit 420 installed inside the discharge electrode 411 and the ground electrode 412 while being insulated from each other, a magnetic field may be formed at an angle of 90 degrees with respect to a direction of current flow to generate heat, so that thermal energy may be transferred in a thermal conductive manner. If a high voltage generated from the high-voltage generator 413 is applied to the discharge electrode 411 and the ground electrode 412 while heating the discharge electrode 411 and the ground electrode 412 at 500° C. or higher, discharge may be started between the two electrodes 411 and 412 to form an electric field-electron energy (5 eV-5 KeV) band, which is larger than 5.0 eV, which is a value of work function of silicon dioxide (SiO$_2$), 1.6 eV, which is a value of work function of calcium oxide (CaO), 4.7 eV, a value of work function of magnesium oxide (MgO), and 5.0 eV, which is a value of work function of alumina (Al$_2$O$_3$), which are the main components of the glassy membrane out of the fly ash. Thus, the glassy membrane covering the surface of the ash particles may be removed through at least on electrochemical reaction out of dissociation, excitation, oxidation and reduction in a discharge process during a process of elastic collision between fly ash particles and charged particles including electrons, ions or the like, and thermal electrons discharged from the surfaces of the two electrodes, and the magnetic fields generated by a current flow to the first heating member 421 and the second heating member of the quantum energy generation unit 420 may extend retention time of thermal electrons and increase a number of elastic collisions between fly ash particles and thermal electrons to improve an efficiency of removing the glassy membrane.

In a state in which the thermal electrons are discharged from the surfaces of the two electrodes 411 and 412 heated at a high temperature, the fly ash with the unburned pulverized coal primarily treated in the thermal decomposition part 300 may be introduced between the two electrodes 411 and 412, which are rotated in opposite directions to each other, then come into contact with the surfaces of the two electrodes 411 and 412, then heated at 500° C., which is an ignition temperature of the unburned pulverized coal, or higher, and then naturally burned under an oxygen atmosphere (oxygen or ionized oxygen ions in air contained in the fly ash), so that the unburned pulverized coal may be removed while generating carbon monoxide (CO) or carbon dioxide (CO) through the combustion process. Alternatively, the combustion reaction may be progressed by spark or flame generated during the discharge operation between the discharge electrode 421 and the ground electrode 422, so that the unburned pulverized coal may be removed while generating carbon monoxide (CO) or carbon dioxide (CO$_2$). Carbon dioxide generated in the process of removing unburned pulverized coal through the combustion reaction may react with calcium oxide (CaO), sodium oxide (Na$_2$O), magnesium oxide (MgO), potassium oxide (K$_2$O) and barium oxide (BaO) in the process of elastic collision with charged particles including electrons, ions or the like, and thermal electrons discharged in a high electric field energy (5 eV-5 KeV) band or higher, which is larger than a work function (eV) (1.1 eV-5.0 eV) of main components of the glassy membrane covering the fly ash particles, which include silicon dioxide (SiO$_2$), calcium oxide (CaO), sodium oxide (Na$_2$O), magnesium oxide (MgO), potassium oxide (K$_2$O) and barium oxide (BaO), so that calcium oxide (CaO) may be converted into calcium carbonate (CaCO$_3$), magnesium oxide (MgO) may be converted into magnesium carbonate (MgCO$_3$), potassium oxide (K$_2$O) may be converted into potassium carbonate (K$_2$CO$_3$), and barium oxide (BaO) may be converted into barium carbonate (BaCO$_3$), thereby removing the glassy membrane, and the reaction formulas for such removal are as shown in the following formulas 1, 2, 3, 4 and 5.

Calcium Oxide (CaO) and Carbon Dioxide (CO$_2$)

$$CaO + CO_2 \blacktriangleright CaCO_3 \qquad \text{[Reaction Formula 1]}$$

Sodium Oxide (BaO) and Carbon Dioxide (CO$_2$)

$$Na_2O + CO_2 \blacktriangleright Na_2CO_3 \qquad \text{[Reaction Formula 2]}$$

Magnesium Oxide (MgO) and Carbon Dioxide (CO$_2$)

$$MgO + CO_2 \blacktriangleright MgCO_3 \qquad \text{[Reaction Formula 3]}$$

Potassium Oxide (K$_2$O) and Carbon Dioxide (CO$_2$)

$$K_2O + CO_2 \blacktriangleright K_2CO_3 \qquad \text{[Reaction Formula 4]}$$

Barium Oxide (BaO) and Carbon Dioxide (CO$_2$)

$$BaO + CO_2 \blacktriangleright BaCO_3 \qquad \text{[Reaction Formula 5]}$$

Silicon dioxide (SiO$_2$), which is not removed in the thermal decomposition part (300), may be reacted on the surfaces of the discharge electrode and the ground electrode heated at a high temperature (a discharge point of 3000° C. or higher) in the presence of unburned carbon (C) as shown in Equation 5, and removed while discharging silicon (Si) and carbon monoxide (CO).

Silicon Dioxide ($SiO_2$) and Carbon (C)

 [Reaction Formula 6]

$SiO_2 + 2C \rightarrow Si + 2CO$

Source; ⌈Ulmann's Encyclopedia of Industry, Vol A 23. page 721-748 5th edition 1993, VCH Weinheim⌋

FIG. 6b is a sectional view showing a quantum energy generator of FIG. 5.

Referring to FIG. 6b, a first coil 421 of the quantum energy generator 420 may be wound in a solenoid shape, insulated and installed inside the discharge electrode 411, and a magnetic field may be generated at an angle of 90 degrees with respect to a direction of current flow to heat the discharge electrode 411 at 500° C. or higher and discharge thermal electrons from the surface thereof, if power is supplied from the first power supplier 421a. Further, a second coil 422 of the quantum energy generator 420 may be wound in an opposite direction to the first coil 421, insulated and installed inside the ground electrode 412, and a magnetic field may be generated at an angle of 90 degrees with respect to a direction of current flow to heat the ground electrode 412 at 500° C. or higher and discharge thermal electrons from the surface thereof, if power is supplied from the second power supplier 422a.

In addition, if power is supplied from the first power supplier 421a and the second power supplier 422a to the first and second coils 421 and 422 of the quantum energy generator 420, a magnetic field may be generated at an angle of 90 degrees with respect to a direction of current flowing in each coil due to coils 421 and 422, which are wound in opposite directions to each other. For example, a magnetic field generated from the first coil 421 may be formed in a direction of the second coil 422 and a magnetic field generated from the second coil 422 may be formed in a direction of the first coil 421. Thus, a magnetic field generated from each of the coils 421 and 422 at a center distance between the first coil 421 and the second coil 422, which is seemingly up to a center distance between the discharge electrode 411 and the ground electrode 412, may extend retention time of thermal electrons and electric charges discharged from the surfaces of the two electrodes 411 and 412 in a high electric field energy band formed during a discharge process in the two electrodes 411 and 412, thereby increasing a number of elastic collisions between the fly ash particles passing through a fluid passage formed between the discharge electrode 411 and the ground electrode 412 and charged particles including electrons, ions or the like, and thermal electrons, which are generated from the discharge process of the two electrodes 411 and 412, so as to improve a rate of removing the glassy membrane coated on the fly ash particles. Then, magnetic fields generated from the first coil 421 and the second coil 422 at a center distance between the discharge electrode 411 and the ground electrode 412 are overlapped and extinguished, so that the quantum energy generated in a zero energy state may be irradiated to activate the thermal electrons discharged from the surfaces of the two electrodes 411 and 412, and the charged particles including the electrons, ions or the like, thereby further improving an efficiency of treating the fly ash.

Further, the sources of the power supply 421a and 322a, which supply power to the first and second heating members 421 and 422 of the quantum energy generator 420, may refer to the first and second power suppliers 421a and 422a having a function of controlling the current of power supply therein, which may be one selected from a single-phase voltage source inverter (MPCC: model predictive current control) or a DC-DC converter, which is a combination of a PWM (pulse width modulation) control mode and a PFM (pulse frequency modulation) mode. If power is supplied from the first and second power suppliers 421a and 422a to the first and second heating members 421 and 422, the first and second heating members 411 and 412 generate heat to heat the discharge electrode 421 and the ground electrode 422, which are installed to be spaced apart from each other, at a temperature of 500° C. or higher, thereby discharging thermal electrons from the surfaces thereof. A set temperature may be adjusted through a control circuit input in a pre-programmed control panel 600 and a heating value of the heating members may be adjusted by controlling a current of power supplied to power suppliers 411a and 412a as shown in [Equation 5].

$$H = 0.24\ I^2 Rt \qquad \text{[Equation 5]}$$

Here, H is calory (Kcal/h), I is current (A), R is resistance of a conductor (ohm), and t is a current carrying time (Sec).

Further, an intensity of magnetic field (magnetic flux density) may be adjusted as shown in [Equation 6].

$$B = 2\pi k n I \qquad \text{[Equation 6]}$$

Here, B is an intensity of magnetic field, k is a magnetic constant (K=2×10$^{-6}$ Tm/A), T is a number of coil windings, and I is current.

Further, an intensity of Lorentz Force may be adjusted as shown in [Equation 7].

$$F = BIl \qquad \text{[Equation 7]}$$

Here, F is Lorentz Force, I is current, and l is a length of coil.

Further, the intensity of magnetic field may be used to adjust an amount of quantum energy generated at a zero-magnetic field state in which magnetic fields are overlapped between the first heating member 411 and the second heating member 412.

In addition, a heating value of the first and second coils 421 and 422 of the quantum energy generator 420 may be adjusted to heat the surfaces of the discharge electrode 411 and the ground electrode 412 of the high-voltage discharge unit 410, which are installed to come into surface contact with the first and second coils 421 and 422 outside while being insulated from each other, at 500° C., which is an ignition point of the unburned carbon out of the fly ash, or higher, so that the unburned carbon may be heated at 500° C., which is an ignition temperature, or higher, while passing in contact with the two electrodes 411 and 412, and naturally burned under an oxygen atmosphere and the unburned pulverized coal may be removed while generating carbon monoxide (CO) or carbon dioxide (CO) through the combustion reaction. Alternatively, the unburned pulverized coal may be removed in such a way that the combustion reaction is progressed by spark or flame generated between the discharge electrode (421) and the ground electrode (422) during the discharge operation while generating carbon monoxide (CO) or carbon dioxide ($CO_2$), or the unburned pulverized coal may be removed at the same time due to the combustion reaction caused by a natural ignition under an oxygen atmosphere and the combustion reaction by an ignition source generated by a discharge reaction.

If the control panel 600 supplies AC or DC power to the first coil 421 and the second coil 422 of the quantum energy generator 420, which are wound by a plurality of winding times in opposite directions to each other, Lorentz Force may work in a direction of magnetic field and current flow, which are opposite directions to each other at an angle of 90 degrees to current flow, and the first coil 421 and the second coil 412 may generate heat to heat the discharge electrode and the ground electrode, which are installed at a certain interval up to a temperature input in a control circuit of the pre-programmed control panel.

If the discharge electrode unit 410 is heated up to a set temperature, the driving motor 416 may be driven by receiving power from the control panel 600, and then a high voltage generated from the high-voltage generator 413 may be applied to the discharge electrode 411 and the ground electrode 412 to start an arch discharge between the two electrodes, thereby forming a high electric field energy band.

Further, the high-voltage discharge may be performed through arch discharge, corona discharge, glow discharge and spatter discharge, preferably arc discharge.

The arc discharge may refer to a state of weakly ionized plasma including electrons, ions or neutral gas atoms, and most of the particles are neutral gas atoms including the same number of electrons and ions. In plasma, electrons are relatively lighter than other particles, and thus move at a fast speed in an electric field, thereby obtaining a large amount of energy per unit time, and thus those electrons transfer energy in an elastic or inelastic collision form with other particles. Due to the elastic collision, particles may obtain energy and thus a temperature thereof is raised, while particles may be ionized and excited to a higher energy level due to the inelastic collision. This phenomenon is called the phenomenon of continuity and luminescence of arc discharge.

A phenomenon of line broadening may refer to a case in which a gas particle moving in a plasma state causes a deformation in a radiation spectrum in inelastic collision with disturbing particles. In this case, a profile of radiant rays may be determined depending on a frequency of collisions, a density and velocity of particles, etc. As a distance from a surrounding atom is decreased, a degree of disturbance thereof may become larger. In a high-voltage discharge arc, a main line broadening may occur due to collision broadening caused by disturbing of transition energy levels caused by direct collision between a light source, an excited atom and other disturbing particles. Types of collision broadening may be classified into stark line broadening caused by collision with charged particles including electrons, ions or the like, resonance line broadening, which is caused in case a colliding particle is a particle such as an excited particle, and Van der Waals line broadening caused by collision with other types of neutral atoms.

If this collision broadening is caused by collision between atoms, such collision broadening may be dependent on a pressure of gas, and line broadening caused by collision with charged particles may be dependent on input current.

Plasma may be generated in such a way that electrons are accelerated by a high electric field to ionize molecules of gas. Energy for ionization may be called breakdown voltage and may amount to 5 eV-5 KeV in air. Radicals excited at a high energy state without being ionized may be generated a lot in plasma, thus causing various chemical reactions.

Source: ⌈Analysis of Time-Varying Characteristics of High-Pressure Arc Discharge System⌋ written by Wang-yeol Park (1991)

Source: "Study on purifying air indoors for multi-use facilities using arch discharge 44p-54p" written by Bu-yeol Kim (2011)

Arch discharge may have a feature in that a voltage is decreased and current is increased when starting discharge unlike glow discharge or corona discharge, particularly in that thermal electrons are discharged from the surfaces of the two electrodes 411 and 412 as a role of the negative electrodes through heating of the two electrodes 411 and 412.

The electrons may obtain energy while moving at a high speed within the arc discharge area, and may transfer energy by causing an elastic collision with other particles. At that time, a temperature of particles may be increased, and particles may become ionized and excited to a high energy level through an inelastic collision, thus causing arch discharge continuously.

Further, during the occurrence of arch discharge, electrons and thermal electrons may move between the two electrodes 411 and 412 at a fast speed and the particles having obtained a large amount of energy per unit time may be subject to elastic collision so as to obtain energy. At that time, high-temperature heat may occur. This temperature thereof may amount to about 3,000 to 6,000° C. Further, the particles may be ionized and excited to an energy level in an inelastic collision, which occurs after an elastic collision, and light (flame) may be generated in the process of resolving excitation.

The first and second coils 421 and 422, which are wound in opposite directions to each other, may be installed inside the discharge electrode 411 and the ground electrode 412, and then the first and second coils 421 and 422 may generate heat to heat the discharge electrode 411 and the ground electrode 412, thereby promoting the release of thermal electrons from the electrodes. Then, a magnetic field may be applied to confine the thermal electrons in a discharge area, thereby extending retention time thereof, increasing a number of elastic collisions with fly ash particles passing through the discharge area, dissociating gas-phase materials such as oxygen ($O_2$), nitrogen ($N_2$), vapor molecule ($H_2O$) and sulfur oxide (SOX), which form air contained in the fly ash, so as to remove air pollutants contained in the fly ash through an oxidation and reduction reaction with the generated oxygen ion (O), nitrogen ion (N), hydrogen proton (H+), hydroxyl ion (OH−), sulfur oxide (SOX) and nitrogen oxide (NOX).

Further, in a process of elastic collision between fly ash particles and charged particles including electrons, ions or the like, and thermal electrons, which are discharged from the two electrodes 411 and 412 through the generation of a field-electron energy (IE, eV), which is larger than a value of work function of the main components of the glassy membrane covering the surface of fly ash in the two electrodes 411 and 412 heated at a high temperature in a high electric field area, which includes 5.0 eV for silicon dioxide ($SiO_2$), 1.6 eV for calcium oxide (CaO), 4.7 eV for magnesium oxide (MgO), 1.1 eV for barium oxide (BaO), and 5.0 eV for alumina ($Al_2O_3$), to efficiently remove a glassy membrane covering the surface of the fly ash, it is necessary to form a high electric field energy band capable of sufficiently removing the glassy membrane covering the surface of the fly ash between the two electrodes 411 and 412 by generating a high voltage having a larger value than in the high-voltage generator 413 and then applying such voltage to the electrodes 411 and 412. To that end, with regard to a voltage at the input and output sides of the power supplier 412a for the discharge electrode 411 and the ground electrode 412, it is required that a field-electron energy (1E, eV) capable of cleaving a covalent bonding of oxygen molecule ($O_2$) is 12.0857 eV or more, a field-electron energy (1E, eV) capable of cleaving a covalent bonding of water molecule is 12.621 eV or more, a field-electron energy (1E, eV) capable of cleaving a covalent bonding of hydrogen molecule (H2) is 15.4259 eV or more, a field-electron energy (1E, eV) capable of cleaving a covalent bonding of sulfur dioxide ($SO_2$) is 12.349 eV or more, a field-electron energy (1E, eV) capable of cleaving a covalent bonding of sulfur trioxide (SO3) is 12.8 eV or more, a field-electron energy (1E, eV) capable of cleaving a covalent bonding of nitrogen oxide (NO) is 9.2542 eV or more, a field-electron energy (1E, eV) capable of cleaving a covalent bonding of nitrogen dioxide ($NO_2$) is 9.586 eV or more, a field-electron energy (1E, eV) capable of cleaving a covalent bonding of nitrous oxide ($N_2O$) is 12.889 eV or more, a field-electron energy (1E, eV) capable of cleaving a covalent bonding of carbon monoxide (CO) is 14.014 eV or more, and a field-electron energy (1E, eV) capable of cleaving a covalent bonding of carbon dioxide (CO) is 13.777 eV or more. After the molecules are dissociated, it is necessary to have a dissociation energy for cleaving an inter-atomic covalent bonding, which includes 414 KJ/mol or more for C—H bonding, 389 KJ/mol or more for N—H bonding, 348 KJ/mol or more for O—H bonding, 163 KJ/mol or more for N—N bonding, 146 KJ/mol or more for O—O bonding, 253 KJ/mol or more for Cl—F bonding, 293 KJ/mol or more for C—N bonding, 201 KJ/mol or more for N—O bonding, 190 KJ/mol or more for O—F bonding, 242 KJ/mol or more for Cl—Cl bonding, 351 KJ/mol or more for C—O bonding, 272 KJ/mol or more for N—F bonding, 611 KJ/mol or more for C≡C bonding, 837 KJ/mol or more for C=C bonding, 615 KJ/mol or more for C=N bonding, and 799 KJ/mol or more for C=O bonding. And it is also necessary to have a field-electron energy (IE,eV), which is larger than a value of work function of main components of the glassy membrane, which includes 5.0 eV for silicon dioxide ($SiO_2$), 1.6 eV for calcium oxide (CaO), 4.7 eV for magnesium oxide (MgO), 1.1 eV for barium oxide (BaO), and 5.0 eV for alumina ($Al_2O_3$).

Source:
1. (http://aceco.ca/wp-content/uploads/2015/03/ChemicaleV1.pdf)
2. Chemical-Covalent Bonding Energy|Written by Flishming In case of alternative current voltage (A.C), a voltage may be 100V or more and frequency may be 60 Hz or more. In case of direct current voltage (D.C), a voltage may be 12V or more. In case of A.C and D.C voltages, a voltage at an output side may be appropriately selected from a range of 1 KV to 500 KV considering field conditions and throughputs. In case of A.C voltage, a frequency may be appropriately selected from a range of 60 to 50 KHz considering field conditions and throughputs.

FIG. 6c is a sectional view showing a dedusting unit of FIG. 5.

Referring to FIG. 6c, the dedusting unit 430 may include a driving motor 431, a driving shaft 432 and a brush 433. The dedusting unit 430 may be installed under the discharge electrode 411 and the ground electrode 412 of the high-voltage discharge part 410, in which the brush 433 is rotated in an opposite direction to the discharge electrode 411 and the ground electrode 412 to remove the fly ash attached to the surfaces of the two electrodes 411 and 412.

A material of the brush for the dedusting unit 430 may include any material which is not deformed in an environment of high temperature and is wear resistant, and may include a material which is available in the market.

A revolution per minute of the dedubsting units 431a and 431b may be the one selected from a range of 50 to 300 RPM.

Further, an anti-dust plate 403 extending from one side of the housing 401 may be installed at a lower part of the brush 431 for the dedusting unit 430 to collect dust eliminated from the brush and discharge the collected dust to a discharge port.

FIG. 6d is a sectional view showing a compressed air feeder of FIG. 5.

Referring to FIG. 6d, the compressed air feeder 440 may include an air compressor 441, a compressed air storage tank 442, a cooler 443, a dryer 444, a feeding line 445 and a spray nozzle 446.

Outside air may be absorbed from the air compressor 441, pressurized in a range of 200 to 5000 mmaq, stored in a storage tank 442, sent to the cooler 443, cooled down in a range of 25 to 35° C., sent to the dryer 444 to dehumidify moisture in air, sprayed onto the fly ash, which is introduced through a feeding pipe 445 to the spray nozzle 446 installed over the high voltage discharge part 420 inside the housing 401, and mixed to form an air void between the fly ash particles, thereby facilitating discharge in the high voltage discharge part 410.

FIG. 7 is a sectional view showing a second reservoir of FIG. 1.

Referring to FIG. 7, the second reservoir 500 may include a hopper 501, a motor-operated valve 502, a blower 503, a discharge pipe 504, a screw 505, a motor 506, a storage tank 507, a filtered dust collector 508 and a discharge electromagnetic valve 509.

The fly ash discharged after being finally treated in the electrochemical reaction part 400 may be temporarily stored in the hopper 501. If the motor 506 is driven while feeding the air compressed by the blower 503 to the discharge pipe 504 at the same time, and if the motor-operated valve 502 installed at the lower part of the hopper 501 is open while driving the screw 505 in the discharge pipe 504 connected to a shaft of the motor 506, the fly ash fed into the hopper 501 may be fed into the discharge pipe 504. If the motor 506 is driven along with the compressed air fed from the blower 503, the screw 505 connected to a shaft of the motor may be rotated. If the fly ash introduced in the discharge pipe 504 is fed into the storage tank 506, the fly ash floating in the tank 507 by an air pressurized introduced from the blower 503 may be collected in a filter medium of a filtered dust collector 508, and then exhausted into the air.

FIG. 8 is a sectional view showing a control panel of an apparatus for recycling fly ash having a quantum energy generator therein according to the present invention.

Referring to FIG. 8, the control panel 600 may perform a control activity of supplying and shutting off power through data, which are measured in real time by sensors such as a fluid flow sensing (not shown), etc., and levels (not shown) attached to the first reservoir 100, the feeder 200, the thermal decomposition part 300, the electrochemical reaction part 400 and the second reservoir 500 and transmitted to the control part.

Preferred embodiments of the present disclosure have been described in detail as above, but the present invention is not limited thereto, and it is to be understood that those skilled in the art to which the present invention pertains may carry out various modifications without departing from the purpose of the present invention claimed in the following claims and those modifications are within the scope of the descriptions of the claims.

DESCRIPTION OF REFERENCE NUMERALS

100: First reservoir,
101: Tank lorry, 102: Blower,
103: Feeding pipe, 104: Storage tank,
105: Rotary valve,
200: Feeder,
201: Blower, 202: Feeding pipe,
203: Rotating screw, 204: Driving motor,
205: Discharge port,
300: Thermal decomposition part,
301: Housing, 311: First heating member,
311a: DC power supplier, 312: Second heating member,
312a: DC power supplier, 321: First negative electrode,
321a: DC power supplier, 321a: DC power supplier,
322: Second negative electrode, 322a: DC power supplier,
331: First positive electrode, 331a: DC power supplier,
332: Second positive electrode, 332a: DC power supplier,
340: Steam feeder, 341: Steam generator,
341a: Power supplier, 342: Feeding conduit,
342a: Conducting wire, 343: Burner,
343a: High-frequency induction heating coil, 344: Chamber,
345: Electromagnetic valve, 346: Spray nozzle,
400: Electrochemical reaction part,
401: Housing, 402: Upper indicator board,
403: Lower indicator board, 410: High-voltage discharge unit,
411: Discharge electrode, 411a: Power supplier,
412: Ground electrode, 412a: Power supplier,
413: High-voltage generator, 414: Conduit,
415: Connecting shaft, 416: Driving motor,
420: Quantum energy generator, 421: First coil,
421a: Power supplier, 422: Second coil,
422a: Power supplier,
430: Dedusting unit, 431: Driving motor,
432: Driving shaft, 433: Brush
440: Compressed air feeder, 441: DC power supplier,
442: Storage tank, 443: Cooler,
444: Dryer, 445: Feeding pipe,
446: Spray nozzle,
500: Second storage tank,
501: Hopper, 502: Motor-operated valve,
503: Blower, 504: Discharge pipe,
505: Screw, 506: Motor,
507: Storage tank, 508: Filtered dust collector,
509: Discharge electromagnetic valve, and
600: Control panel

The invention claimed is:

1. An apparatus for recycling fly ash having a quantum energy generator therein, the apparatus comprising:
a first reservoir installed at a rear end of a boiler of a thermal power plant and configured to transport fly ash discharged from an electric dust collector by using a tank lorry, transfer the fly ash into a blower attached to a vehicle body, and feed and store the fly ash into a storage tank through a feeding pipe;
a feeder connected to the storage tank and configured to feed high-pressure air generated from a blower installed at one side of a feeding pipe and open a rotary valve installed at a lower part of the storage tank to feed the fly ash stored in the first reservoir, and configured to drive a driving motor to rotate a screw connected with a motor by a shaft in order to discharge the fly ash through a discharge port connected to a thermal decomposition part;

wherein:
the thermal decomposition part includes:
a first quantum energy generator including a first heating member, a second heating member and power suppliers;
a negative electrode including a first negative electrode, a second negative electrode and power suppliers; and
a positive electrode including a first positive electrode, a second positive electrode and power suppliers; and
a steam feeder including a steam generator, a feeding conduit, a burner, a chamber, an electromagnetic valve and a spray nozzle or including a steam generator, a power supplier, a conducting wire, a high-frequency induction heating coil, an electromagnetic valve and a spray nozzle,
the thermal decomposition part is configured to:
discharge thermal electrons from surfaces of the heating members and the negative electrodes by heating the heating members and the negative electrodes at a high temperature of 500° C. or higher by supplying DC power to a first plurality of heating members of the first quantum energy generator and the negative electrodes from DC power suppliers,
accelerate by electrical attraction the thermal electrons discharged from the surfaces of the first plurality of heating members of the first quantum energy generator and the negative electrodes, which are heated by giving a potential difference between DC power suppliers for the first plurality of heating members of the first quantum energy generator and DC power suppliers for the negative electrodes, and between DC power suppliers for negative electrodes and DC power suppliers for positive electrodes,
primarily remove unburned pulverized coal while generating carbon monoxide (CO) or carbon dioxide ($CO_2$) through a combustion reaction, in which the unburned pulverized coal out of the fly ash comes into contact with the surfaces of the negative electrodes heated at a high temperature of 500° C., which is an ignition point of carbon (C), or higher so that the unburned pulverized coal is naturally burned under an oxygen atmosphere (oxygen in air contained in the fly ash), in a process of increasing a number of elastic collisions with fly ash particles passing through a fluid passage formed between the negative electrodes and the positive electrodes by extending retention time of the thermal electrons discharged from the surfaces of the heating members and the negative electrodes by a magnetic field generated at an angle of 90 degrees with respect to a direction of current flow by supplying power to the first plurality of heating members of the first quantum energy generator, which are wound in opposite directions to each other, from the DC power suppliers,
primarily remove a glassy membrane coated on the fly ash particles while generating carbonates including calcium carbonate ($CaCO_3$), sodium carbonate ($Na_2CO_3$), magnesium carbonate ($MgCO_3$), potassium carbonate ($K_2CO_3$) and barium carbonate by allowing the carbon dioxide ($CO_2$) generated in the process of removing the unburned pulverized coal to react with main components of the glassy membrane coated on the fly ash particles, which include calcium oxide (CaO), sodium oxide (Na$_2$O), magnesium oxide (MgO), potassium oxide (K$_2$O) and barium oxide(BaO), or remove the glassy membrane by spraying superheated steam generated from a steam feeder onto the fly ash introduced through the spray nozzle in an environment in which the magnetic field is generated from the first and second heating members, quantum energy generated in a zero magnetic field state caused by an extinguishment of the magnetic field is irradiated, and the thermal electrons discharged from the heated negative electrodes are accelerated in a direction of the positive electrodes by electrical attraction, thereby allowing the steam and the fly ash particles to come into contact with each other or to be mixed with each other while causing a hydration reaction, so that main components of the glassy membrane coated on the surface of the fly ash particles, which include silicon dioxide (SiO$_2$), calcium oxide (CaO), sodium oxide (Na2O), magnesium oxide (MgO), potassium oxide (K$_2$O) and barium oxide (BaO) are converted into basic materials including silicon hydroxide (Si(OH)$_4$), calcium hydroxide (Ca(OH)$_2$), sodium hydroxide (NaOH), barium hydroxide (Ba(OH)$_2$), magnesium hydroxide (Mg(OH)$_2$) and aluminum hydroxide (2Al(OH)$_3$);

an electrochemical reaction part includes:
  a housing,
  a high-voltage discharge unit,
  a second quantum energy generator,
  a dedusting unit, and
  a compressed air feeder, in which a discharge electrode and a ground electrode of a discharge unit, which is provided therein with a second plurality of heating members of the second quantum energy generator wound in opposite directions from each other and insulated from each other, are installed inside a housing to face each other, each one side of the discharge electrode and the ground electrode is connected to a shaft and passes through the housing so as to be connected to a driving motor installed in an external holder, power suppliers supply power to the heating members of the second quantum energy generator installed inside the discharge electrode and the ground electrode while being insulated from each other to generate heat while forming a magnetic field at an angle of 90° C. with respect to a direction of current flow to heat the discharge electrode and the ground electrode at 500° C., which is an ignition temperature of unburned pulverized coal, or more, the motor connected to the discharge electrode and the ground electrode by the shaft is driven, so that the discharge electrode and the ground electrode are rotated while engaging with each other in opposite directions at a predetermined interval, outside air is absorbed and pressurized in an air feeder, so that the fed air is sprayed onto the discharge electrode and the ground electrode through a spray nozzle installed above the discharge electrode and the ground electrode while being spaced apart from the discharge electrode and the ground electrode, thereby mixing the fly ash particles and the sprayed air to give an air void between the fly ash particles (a distance between particles), a high voltage generated from a high-voltage generator is supplied to the discharge electrode and the ground electrode through a conducting wire to form a high electric field energy (5 eV-5 KeV) band between the two electrodes, which is larger than a work function (eV)(1.1 eV-5.0 eV) of main components of a glassy membrane, which include silicon dioxide (SiO$_2$), calcium oxide (CaO), sodium oxide (Na$_2$O), magnesium oxide (MgO), potassium oxide (K$_2$O) and barium oxide (BaO), air which is produced by absorbing and pressurizing the outside air in the compressed air feeder is sprayed through the spray nozzle onto the fly ash introduced between the two electrodes, and so that the fly ash and the air are mixed together to give the air void (gap) between the fly ash particles to facilitate an elastic collision between the thermal electrons and spherical (ball-shaped) fly ash particles, the fly ash particles are subject to the elastic collision with charged particles including electrons or ions, and thermal electrons discharged during a discharge process in the high electric field energy band formed between the two electrodes, a magnetic field generated when power is supplied to the heating members of the quantum energy generator extends a retention time of the charged particles including electrons or ions and thermal electrons in the two electrodes, magnetic fields generated in opposite directions to each other in a structure, in which the heating members are wound in opposite directions to each other, are overlapped and extinguished so that the quantum energy generated in a zero energy state is irradiated to activate the charged particles including the electrons or ions and thermal electrons and to increase a number and intensity of elastic collisions with the fly ash particles, unburned carbon, which is not removed by the thermal decomposition part, comes into contact with the surfaces of the two electrodes heated at a high temperature, and is heated at a temperature of 500° C. or more, so that the unburned carbon is naturally burned under an oxygen atmosphere (oxygen or ionized oxygen ions in air contained in the fly ash), and becomes the unburned pulverized coal while generating carbon monoxide (CO) or carbon dioxide (CO$_2$) through the combustion reaction, the combustion reaction is progressed by spark or flame generated between the discharge electrode and the ground electrode during the discharge operation to generate carbon monoxide (CO) or carbon dioxide (CO$_2$) so that the unburned pulverized coal is removed or secondarily removed due to the combustion reaction caused by a natural ignition under an oxygen atmosphere and the combustion reaction by an ignition source generated by a discharge reaction, the carbon dioxide (CO$_2$), which is generated in the secondary removal process for the unburned pulverized coal, reacts with the main components of the glassy membrane coated on the fly ash particles, which are not removed by the elastic collision between the fly ash particles and charged particles including electrons or ions and thermal electrons in a high electric field area formed between the charged electrodes, including calcium oxide (CaO), sodium oxide(Na$_2$O), magnesium oxide (MgO), potassium oxide (K$_2$O) and barium oxide (BaO) in a high electric field energy band, so that calcium oxide (CaO) is converted into calcium carbonate (CaCO$_3$), sodium oxide (Na$_2$O) is converted into sodium carbonate (Na$_2$CO$_3$), magnesium oxide (MgO) is converted into magnesium carbonate (MgCO$_3$), potassium oxide (K$_2$O) is converted into potassium carbonate (K$_2$CO$_3$), and barium oxide (BaO) is converted into barium carbonate(BaCO$_3$), thereby removing again the glassy membrane, and a motor connected by a shaft with a brush rotating in opposite direction to the discharge electrode and the ground electrode is driven to eliminate the fly ash particles attached onto the discharge electrode and the ground electrode;

a second reservoir connected to the electrochemical reaction part and configured to feed the fly ash processed in the electrochemical reaction part into a storage tank while feeding high-pressure air generated from a blower installed at one side of a discharge pipe to the discharge pipe and by driving a driving motor to rotate a screw shaft connected with a motor through a shaft; and a control panel configured to supply and shut off power of the first storage pool, the feeder, the thermal decomposition part, the electrochemical reaction part and the second storage pool.

2. The apparatus of claim 1, wherein the thermal decomposition part:

includes the first quantum energy generator including the first heating member, the second heating member and the power supplier, the first negative electrode, the second negative electrode, the first positive electrode, the second positive electrode and a power supplier thereof, in which the thermal decomposition part is configured to accelerate the thermal electrons discharged from a surface of the first heating member, heated by supplying power from the DC power supplier, in a direction of the first negative electrode by electrical attraction and accelerate the thermal electrons discharged from a surface of the first negative electrode heated in a direction of the first positive electrode by electrical attraction by commonly wiring a negative (−) terminal of a DC power supplier for the first heating member, a negative (−) terminal of the DC power supplier for the first negative electrode and a negative (−) terminal of the DC power supplier for the first positive electrode with a negative (−) terminal at an output side of the DC power supplier, and is configured to accelerate the thermal electrons discharged from a surface of the second heating member, heated by supplying power from the DC power supplier, in a direction of the second negative electrode by electrical attraction and accelerate the thermal electrons discharged from a surface of the second negative electrode heated in a direction of the second positive electrode by electrical attraction by commonly wiring the DC power supplier for the second heating member, the DC power supplier for the second negative electrode and the DC power supplier for the second positive electrode with a negative (−) terminal at an output side of the DC power supplier, a negative (−) terminal of the DC power supplier and a negative (−) terminal of the DC power supplier.

3. The apparatus of claim 2, wherein:

the DC power supplier for the first heating member, the DC power supplier for the first negative electrode, and the (−) terminal at the output side of the DC power supplier for the first positive electrode are commonly wired, and a potential difference between output sides of the DC power supplier and the DC power supplier is maintained in a range of 1 to 10 KV, and a potential difference between output sides of the DC power supplier and the DC power supplier is maintained in a range of 1 to 10 KV, so that the first heating member is heated to increase an intensity of electrical attraction caused by the potential difference, thereby additionally accelerating the thermal electrons discharged from the surface thereof in a direction of the first negative electrode, and the first negative electrode is heated to increase the intensity of electrical attraction caused by the potential difference, thereby additionally accelerating the thermal electrons discharged from the surface thereof in a direction of the first positive electrode, and wherein the DC power supplier for the second heating member, the DC power supplier for the second negative electrode, and the (−) terminal at the output side of the DC power supplier for the first positive electrode are commonly wired, a potential difference between output sides of the DC power supplier and the DC power supplier is maintained in a range of 1 to 10 KV, and a potential difference between output sides of the DC power supplier and the DC power supplier is maintained in a range of 1 to 10 KV, so that the second heating member is heated to increase an intensity of electrical attraction caused by the potential difference, thereby additionally accelerating the thermal electrons discharged from the surface thereof in a direction of the second negative electrode, and the second negative electrode is heated to increase the intensity of electrical attraction caused by the potential difference, thereby additionally accelerating the thermal electrons discharged from the surface thereof in a direction of the second positive electrode.

4. The apparatus of claim 2, wherein the first and second heating members of the quantum energy generation part of the thermal decomposition part are wound in opposite directions to each other as a coil shape and magnetic fields are generated at an angle of 90 degrees with respect to a direction of electric current flow, when power is supplied from the DC power suppliers, so that quantum energy is generated at a zero magnetic field state in which the magnetic fields are overlapped with each other.

5. The apparatus of claim 2, wherein the surfaces of the first and second negative electrodes are coated with at least one catalytic material of BaO, SrO and CaO to promote release of thermal electrons, and the surfaces of the first and second positive electrodes are coated with at least one material selected from titanium dioxide (TiO2), rhodium (Rh), platinum (Pt), palladium (Pd), ruthenium (Ru), zinc (Zn), zirconium (Zr), hafnium, vanadium (V2O5), niobium, tungsten (W), iron (Fe), ruthenium oxide (RuO2 and RuO4), rhodium oxide (Rh2O3), copper oxide (CuO), zinc oxide (ZnO), zirconium oxide (ZrO2), silicon dioxide (SiO$_2$), titanium oxide (TiO2), hafnium oxide (HfO2), aluminum oxide (Al2O3), vanadium oxide (VO and V2O3), niobium oxide (Nb2O5), tungsten oxide (WO), manganese (Mn) and iron oxide (FeO) so as to promote the release of the thermal electrons, thereby improving an efficiency of treating the fly ash and improving an efficiency of removing NOX and SOX materials.

6. The apparatus of claim 2, wherein unburned pulverized coal out of fly ash comes into contact with surfaces of the negative electrodes and is heated at 500° C., which is an ignition temperature of carbon (C), or higher in an environment where thermal electrons are discharged from surfaces of the negative electrodes heated at a temperature of 500° C. or higher, so that unburned carbon (C) out of the fly ash is naturally burned under an oxygen atmosphere (oxygen or ionized oxygen ions in air contained in the fly ash) and removed while generating carbon monoxide (CO) or carbon dioxide ($CO_2$) through a combustion reaction.

7. The apparatus of claim 6, wherein the glassy membrane coated on the fly ash particles are removed, in an environment where thermal electrons are discharged from surfaces of the negative electrodes heated at a temperature of 500° C. or higher, by allowing the carbon dioxide ($CO_2$) discharged while removing unburned pulverized coal through a combustion reaction to react with main components of the glassy membrane coated on the fly ash particles, which include calcium oxide (CaO), sodium oxide ($Na_2O$), magnesium oxide (MgO), potassium oxide ($K_2O$) and barium oxide (BaO), thereby generating carbonates such as calcium carbonate ($CaCO_3$), sodium carbonate ($Na_2CO_3$), magnesium carbonate ($MgCO_3$), potassium carbonate ($K_2CO_3$) and barium carbonate ($BaCO_3$).

8. The apparatus of claim 2, wherein the glassy membrane coated on the fly ash particles are removed, in an environment where thermal electrons are discharged from surfaces of the negative electrodes heated at a temperature of 500° C. or higher, by allowing the carbon dioxide ($CO_2$) discharged while removing unburned pulverized coal through a combustion reaction to react with main components of the glassy membrane coated on the fly ash particles, which include calcium oxide (CaO), sodium oxide ($Na_2O$), magnesium oxide (MgO), potassium oxide ($K_2O$) and barium oxide (BaO), thereby generating carbonates including calcium carbonate ($CaCO_3$), sodium carbonate ($Na_2CO_3$), magnesium carbonate ($MgCO_3$), potassium carbonate ($K_2CO_3$) and barium carbonate ($BaCO_3$).

9. The apparatus of claim 2, wherein the steam feeder comprises a steam generator, a feeding conduit, a burner, a chamber, an electromagnetic valve and a spray nozzle or comprises a steam generator, a power supplier, a conducting wire, a high-frequency induction heating coil, an electromagnetic valve and a spray nozzle, and is configured to remove the glassy membrane by spraying superheated steam generated from the steam feeder onto the fly ash introduced through the spray nozzle in an environment in which magnetic fields are generated from the first and second heating members and quantum energy generated in a zero magnetic field state caused by an extinguishment of the magnetic fields is irradiated, thereby allowing the steam and the fly ash particles to come into contact with each other or to be mixed with each other while causing a hydration reaction, so that main components of the glassy membrane coated on the surface of the fly ash particles, which include silicon dioxide ($SiO_2$), calcium oxide (CaO), sodium oxide ($Na_2O$), magnesium oxide (MgO), potassium oxide ($K_2O$) and barium oxide (BaO) are converted into basic materials including silicon hydroxide ($Si(OH)_4$), calcium hydroxide ($Ca(OH)_2$), sodium hydroxide (NaOH), barium hydroxide ($Ba(OH)_2$), magnesium hydroxide ($Mg(OH)_2$) and aluminum hydroxide ($2Al(OH)_3$).

10. The apparatus of claim 2, wherein a controller for the DC power suppliers, which supply DC power to the first and second heating members of the first quantum energy generator of the thermal decomposition part, and for the DC power suppliers, which supply DC power to the first and second heating members of the first quantum energy generator of the thermal decomposition part includes one selected from a single-phase voltage source inverter (MPCC: model predictive current control) and a DC-DC converter having a combination of a PWM (pulse width modulation) control mode and a PFM (pulse frequency modulation) mode and equipped with a control function for a current of supplied power to control an amount of generated quantum energy.

11. The apparatus of claim 1, wherein the electrochemical reaction part comprises a housing, a high-voltage discharge unit, a second quantum energy generator, a dedusting unit and a compressed air feeder, a plurality of first indicator boards are installed above the discharge electrode and the ground electrode of the high-voltage discharge unit inside the housing, a spray nozzle, which is connected with a pneumatic feeder, is installed above the plurality of indicator boards, and a plurality of anti-dust plates are installed under the brush of the dedusting unit.

12. The apparatus of claim 11, wherein the high-voltage discharge unit comprises the discharge electrode, the ground electrode, the high-voltage generator the conducting wire, the connecting shaft, the driving motor and a gap-adjusting device (not shown) of the two electrodes, and a shape of the discharge electrode, in which the discharge electrode and the ground electrode have a cylindrical shape with a certain diameter, the first heating member of the second quantum energy generator is installed in a coil shape inside the discharge electrode while being insulated from each other, and the second heating member of the second quantum energy generator is installed in the coil shape inside the ground electrode while being insulated from each other, each one end of the discharge electrode and the ground electrode is connected to the shaft, passes through the housing and is connected to the driving motor installed outside, the discharge electrode and the ground electrode have the cylindrical shape with the certain diameter and are processed to form a plurality of protrusions on an outside surface, so that an electric field is concentrated on the protrusion part, thereby improving a discharge efficiency.

13. The apparatus of claim 11, wherein a method for removing the unburned pulverized coal out of the fly ash in the electrochemical reaction part is to form a high electric field energy (5 eV-5 KeV) band by starting discharge between the electrodes by applying a high voltage generated from the high-voltage generator to the two electrodes heated at 500° C. or higher through the first and second heating members of the second quantum energy generator, so that the unburned pulverized coal out of the fly ash, passing through the high electric field energy band, is naturally burned under an oxygen atmosphere (oxygen or ionized oxygen ions in air contained in the fly ash), and becomes the unburned pulverized coal while generating carbon monoxide (CO) or carbon dioxide ($CO_2$) through the combustion reaction, or the combustion reaction is progressed by spark or flame generated between the discharge electrode and the ground electrode during the discharge operation to generate carbon monoxide (CO) or carbon dioxide ($CO_2$), thereby removing the unburned pulverized coal.

14. The apparatus of claim 13, wherein another method for removing the glassy membrane covering the fly ash particles is to apply a high voltage generated from the high-voltage generator to the two electrodes heated at a temperature of 500° C. or higher through the conducting wire to form a high electric field energy (5 eV-5 KeV) band during the discharge process between the discharge electrode and the ground electrode and to discharge the charged particles including electrons or ions, and thermal electrons, thereby allowing the unburned pulverized coal out of the fly ash passing through the high electric field energy band to come into contact with the surfaces of the electrodes heated at a high temperature, thereby being heated at 500° C., which is an ignition point of pulverized coal, or higher, so that the unburned pulverized coal is naturally burned under an oxygen atmosphere (oxygen or ionized oxygen ions in air contained in the fly ash), and the combustion reaction is progressed by spark or flame generated between the discharge electrode and the ground electrode during the discharge operation, thereby allowing the carbon dioxide ($CO_2$) generated from the combustion reaction to react with main components of the glassy membrane coated on the fly ash particles, which include calcium oxide (CaO), sodium oxide ($Na_2O$), magnesium oxide (MgO), potassium oxide ($K_2O$) and barium oxide(BaO), thereby generating carbonates such as calcium carbonate ($CaCO_3$), sodium carbonate ($Na_2CO_3$), magnesium carbonate ($MgCO_3$), potassium carbonate ($K_2CO_3$), barium carbonate ($BaCO_3$), etc., hereby removing a glassy membrane.

15. The apparatus of claim 11, wherein removal of the glassy membrane covering the fly ash particles is performed by applying a high voltage generated from the high-voltage generator to the discharge electrode and the ground electrode of the high-voltage discharge unit through the conducting wire to start discharge between the discharge electrode and the ground electrode, thereby forming a high electric field-electron energy band, so that the glassy membrane covering the surface of the fly ash is removed in the elastic collision between the fly ash and the charged particles including electrons, ions or the like discharged during a discharge process, in the electric field energy (5 eV-5 KeV) band, in which the high electric field-electron energy between the two electrodes is larger than 5.0 eV, which is a value of work function for silicon dioxide ($SiO_2$), 1.6 eV, which is a value of work function for calcium oxide (CaO), 4.7 eV, a value of work function for magnesium oxide (MgO), 1.1 eV, which is a value of work function for barium oxide (BaO), and 5.0 eV, which is a value of work function for alumina (Al2O3), so as to remove the main components of the fly ash particles, which include silicon dioxide ($SiO_2$), calcium oxide (CaO), magnesium oxide (MgO), barium oxide (BaO) and alumina ($Al_2O_3$).

16. The apparatus of claim 11, wherein another method for removing the glassy membrane covering the fly ash particles is to apply a high voltage generated from the high-voltage generator to the two electrodes heated at a temperature of 500° C. or higher through the conducting wire to form a high electric field energy (5 eV-5 KeV) band during the discharge process between the discharge electrode and the ground electrode and to discharge the charged particles including electrons or ions, and thermal electrons, thereby allowing the unburned pulverized coal out of the fly ash passing through the high electric field energy band to come into contact with the surfaces of the electrodes heated at a high temperature, thereby being heated at 500° C., which is an ignition point of pulverized coal, or higher, so that the unburned pulverized coal is naturally burned under an oxygen atmosphere (oxygen or ionized oxygen ions in air contained in the fly ash), and the combustion reaction is progressed by spark or flame generated between the discharge electrode and the ground electrode during the discharge operation, thereby allowing the carbon dioxide ($CO_2$) generated from the combustion reaction to react with main components of the glassy membrane coated on the fly ash particles, which include calcium oxide (CaO), sodium oxide ($Na_2O$), magnesium oxide (MgO), potassium oxide ($K_2O$) and barium oxide(BaO), thereby generating carbonates including calcium carbonate ($CaCO_3$), sodium carbonate ($Na_2CO_3$), magnesium carbonate ($MgCO_3$), potassium carbonate ($K_2CO_3$), barium carbonate ($BaCO_3$), etc., hereby removing a glassy membrane.

17. The apparatus of claim 11, wherein the second quantum energy generator comprises the first heating member having a coil shape, the second heating member having a coil shape, a power supplier for the first heating member and a power supplier for the second heating member, in which the first heating member is installed inside the discharge electrode of the high-voltage discharge unit, while being insulated from the discharge electrode, and the second heating member is installed inside the ground electrode of the high-voltage discharge unit while being insulated from the ground electrode, so that the thermal energy heated from the first and second heating members generates heat to heat the surfaces of the discharge electrode and the ground electrode at 500° C. or higher in a thermal conductive manner, thereby discharging thermal electrons from the surface thereof, when power is supplied from the power suppliers, so that a magnetic field is generated at an angle of 90 degrees with respect to a direction of current flow in the first and second heating members to extend retention time of thermal electrons in a fluid passage formed between the discharge electrode and the ground electrode, and the first heating member having a coil shape and the second heating member having a coil shape are wound in opposite directions to each other, so that a magnetic field is generated from the first heating member in a direction of 90 degrees with respect to the direction of current flow and is overlapped and extinguished with a magnetic field generated from the second heating member to generate quantum energy in a zero magnetic field state, when power is supplied from the power suppliers, so as to activate the thermal electrons discharged from the surfaces of the discharge electrode and the ground electrode.

18. The apparatus of claim 11, wherein the compressed air feeder comprises an air compressor, a compressed air storage tank, a cooler, a dryer, a feeding line and a spray nozzle, in which outside air absorbed in the air compressor is pressurized in a level of 200 to 5000 mmaq, stored in a storage tank, sent to the cooler, cooled down in a range of 25 to 35° C., sent to the dryer to dehumidify moisture in air, sprayed onto the fly ash, which is introduced through a feeding pipe to the spray nozzle installed over the high-voltage discharge part inside the housing, and mixed to form an air void between the fly ash particles, thereby facilitating discharge in the high-voltage discharge part.

* * * * *